US012726046B2

(12) United States Patent
Aldhaher et al.

(10) Patent No.: US 12,726,046 B2
(45) Date of Patent: Sep. 1, 2026

(54) DIFFERENTIAL RECTIFIER FOR USE IN A WIRELESS POWER RECEIVER, AND METHOD OF RECTIFYING A POWER SIGNAL

(71) Applicant: Solace Power Inc., Mount Pearl (CA)

(72) Inventors: Samer Aldhaher, Mount Pearl (CA); Samuel Robert Cove, Mount Pearl (CA); Thomas Seary, Mount Pearl (CA); Ahmad M. Almudallal, Mount Pearl (CA)

(73) Assignee: Solace Power Inc., Mount Pearl (CA)

( * ) Notice: Subject to any disclaimer, the term of this patent is extended or adjusted under 35 U.S.C. 154(b) by 0 days.

(21) Appl. No.: 18/145,283

(22) Filed: Dec. 22, 2022

(65) Prior Publication Data

US 2023/0198310 A1 Jun. 22, 2023

Related U.S. Application Data

(60) Provisional application No. 63/292,798, filed on Dec. 22, 2021.

(51) Int. Cl.
*H02J 50/12* (2016.01)
*H02J 50/80* (2016.01)
*H04B 5/79* (2024.01)

(52) U.S. Cl.
CPC .............. *H02J 50/12* (2016.02); *H02J 50/80* (2016.02); *H04B 5/79* (2024.01)

(58) Field of Classification Search
None
See application file for complete search history.

(56) References Cited

U.S. PATENT DOCUMENTS

| | | | | |
|---|---|---|---|---|
| 9,653,948 | B2 | 5/2017 | Polu et al. | |
| 10,804,752 | B2 * | 10/2020 | Schumann | H02J 7/00034 |

(Continued)

FOREIGN PATENT DOCUMENTS

| | | | |
|---|---|---|---|
| CN | 111740504 | | 10/2020 |
| EP | 2332096 | B1 | 6/2011 |

OTHER PUBLICATIONS

Tahavorgar Amir; Quaicoe John E., "Stability and Small-Signal Analyses of the Dual Series-Resonant DC-DC Converter", IEEE Transactions on Power Electronics, USA, (Feb. 1, 2019), vol. 34, No. 2, doi:10.1109/TPEL.2018.2830358, ISSN 0885-8993, pp. 1420-1430, XP011701538.

(Continued)

*Primary Examiner* — Adi Amrany
(74) *Attorney, Agent, or Firm* — Harness, Dickey & Pierce, P.L.C.

(57) ABSTRACT

A differential rectifier for use in a receiver for receiving wireless power via inductive coupling comprises first and second capacitors; first and second switching elements; and first and second inductors. The first capacitor and first inductor are electrically connected in series, and the second capacitor and second inductor are electrically connected in series. The first switching element is electrically connected between the first capacitor and first inductor in parallel, and the second switching element is electrically connected between the second capacitor and second inductor in parallel. The first capacitor electrically is connected to a terminal of a coil for receiving power wirelessly via inductive coupling, and the second capacitor is electrically connected to another terminal of a coil for receiving power wirelessly via inductive coupling. The first and second switching elements are electrically connected to a tap of a coil for receiving power wirelessly via inductive coupling.

12 Claims, 21 Drawing Sheets

(56) References Cited

U.S. PATENT DOCUMENTS

| | | | | |
|---|---|---|---|---|
| 2004/0179378 | A1* | 9/2004 | Tamura | H02M 3/33571 363/20 |
| 2010/0177536 | A1* | 7/2010 | Liu | H02M 3/33592 363/127 |
| 2011/0194206 | A1* | 8/2011 | Sase | H02M 3/33592 360/75 |
| 2011/0241781 | A1* | 10/2011 | Owen | H03F 3/265 330/277 |
| 2013/0241303 | A1 | 9/2013 | Bae | |
| 2016/0020615 | A1* | 1/2016 | Turki | H02J 50/90 307/104 |
| 2018/0090995 | A1* | 3/2018 | Arasaki | H02H 9/041 |
| 2018/0233942 | A1* | 8/2018 | Qiu | H02J 50/10 |
| 2019/0140481 | A1* | 5/2019 | Keeling | H02J 50/005 |
| 2019/0165611 | A1* | 5/2019 | Miyazawa | H02M 7/06 |
| 2019/0305612 | A1* | 10/2019 | Oshima | B60L 53/12 |
| 2020/0227945 | A1* | 7/2020 | Hemphill | H04B 5/79 |
| 2020/0382018 | A1 | 12/2020 | Spinella | |
| 2021/0083634 | A1 | 3/2021 | Aldhaher | |
| 2022/0247221 | A1* | 8/2022 | Yu | H02J 50/12 |

OTHER PUBLICATIONS

Vlad Marian ; Bruno Allard ; Christian Vollaire ; Jacques Verdier, “Strategy for Microwave Energy Harvesting From Ambient Field or a Feeding Source”, IEEE Transactions on Power Electronics, USA , (Nov. 1, 2012), vol. 27, No. 11, doi:10.1109/TPEL.2012.2185249, ISSN 0885-8993, pp. 4481-4491, XP011448266.

Supplementary Partial European Search Report for Application 22908976 dated Oct. 3, 2025.

Slobodan Cuk et al. “Advances in Switched-Mode Power Conversion Part II”, IEEE Transactions on Industrial Electronics, IEEE Service Center, Piscataway, NJ, USA, vol. 54, No. 1, Feb. 1, 1983, p. 19-29, XP011180442, ISSN: 0278-0046.

* cited by examiner

250'

300'

Delay Line
Sig. Gen.
864a
864b
818
404
810
856
822
860
814
862
858
812
816
300
866a
866b
820
802
800
Delay Line
Sig. Gen.
868
802
800

DIFFERENTIAL RECTIFIER FOR USE IN A WIRELESS POWER RECEIVER, AND METHOD OF RECTIFYING A POWER SIGNAL

CROSS-REFERENCE TO RELATED APPLICATION

This application claims the benefit of U.S. Provisional Application No. 63/292,798 filed on Dec. 22, 2021, the entire content of which is incorporated herein by reference.

FIELD

The subject disclosure relates generally to wireless power transfer, and in particular to a differential rectifier for use in a receiver for receiving wireless power via inductive coupling, a receiver and a coil for use in a wireless power transfer system, a load independent inverter, and a method of rectifying a power signal received at a receiver of a wireless power transfer system.

BACKGROUND

Wireless power transfer systems such as wireless charging are becoming an increasingly important technology to enable the next generation of devices. The potential benefits and advantages offered by the technology are evident by the increasing number of manufacturers and companies investing in the technology.

A variety of wireless power transfer systems are known. A typical wireless power transfer system includes a power source electrically connected to a wireless power transmitter, and a wireless power receiver electrically connected to a load.

In magnetic induction systems, the transmitter has a transmitter coil with a certain inductance that transfers electrical energy from the power source to the receiver, which has a receiver coil with a certain inductance. Power transfer occurs due to coupling of magnetic fields between the coils or inductors of the transmitter and receiver. The range of these magnetic induction systems is limited, and the coils or inductors of the transmitter and receiver must be tightly coupled, i.e., have a coupling factor above 0.5 and be in optimal alignment for efficient power transfer.

There also exist resonant magnetic systems in which power is transferred due to coupling of magnetic fields between the coils or inductors of the transmitter and receiver. The transmitter and receiver inductors may be loosely coupled, i.e. have a coupling factor below 0.5. However, in resonant magnetic systems the inductors are resonated using at least one capacitor. Furthermore, in resonant magnetic systems, the transmitter is self-resonant and the receiver is self-resonant. The range of power transfer in resonant magnetic systems is increased over that of magnetic induction systems and alignment issues are reduced. While electromagnetic energy is produced in magnetic induction and resonant magnetic systems, the majority of power transfer occurs via the magnetic field. Little, if any, power is transferred via electric induction or resonant electric induction.

In electrical induction systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. The inductor may be a coil. In resonant electric systems, the transmitter is self-resonant and the receiver is self-resonant. Resonant electric systems have an increased range of power transfer compared to that of electric induction systems and alignment issues are rectified. While electromagnetic energy is produced in electric induction and resonant electric systems, the majority of power transfer occurs via the electric field. Little, if any, power is transferred via magnetic induction or resonant magnetic induction.

While some wireless power transfer systems are known, improvements are desired. It is therefore an object to provide a novel wireless power transfer transmitter, receiver, system and method of wirelessly transferring power.

This background serves only to set a scene to allow a person skilled in the art to better appreciate the following brief and detailed descriptions. Therefore, none of the above discussion should necessarily be taken as an acknowledgement that the discussion is part of the state of the art or is common general knowledge. One or more aspects/embodiments described below may or may not address one or more of the background issues.

BRIEF DESCRIPTION

Accordingly, in one aspect there is provided a differential or push-pull rectifier for use in a receiver for receiving power wirelessly. The power may be received by inductive or magnetic coupling. Inductive coupling is generation of a current through electromagnetic induction from a magnetic field. In wireless power transfer, a transmitter may generate a magnetic field which induces a current in a receiver when the receiver is placed within the generated field.

The signal received at the receiver is a differential alternating current (AC) signal. In many applications, the load of the receiver requires a direct current (DC) signal. A rectifier is used to rectify the received AC signal to the required DC signal.

The described differential rectifier may improve efficiency and performance over conventional rectifier. Further the described differential rectifier may comprise fewer components than a conventional rectifier. This may provide a rectifier which has reduced size and is therefore useful in a greater variety of applications.

The differential rectifier may be for use with a receiver coil of a receiver of a wireless power transfer system. The coil may be for extracting power via inductive or magnetic field coupling from a generated field. The coil may extract power via resonant magnetic field coupling. The coil may be centre-tapped.

The differential rectifier may comprise a pair of capacitive elements, a pair of switching elements, and a pair of inductive elements. Each capacitive element may comprise a capacitor. Each switching element may comprise a switch such as an active switch, diode or field-effect transistor (FET). Each inductive element may comprise an inductor.

The differential rectifier may comprise only two switching elements or diodes. Only two diodes may provide a rectifier which has fewer diodes than conventional rectifiers and therefore takes up less space. The rectifier may therefore be useful in applications which have size constraints.

The inductor may comprise an iron core inductor. The inductor may comprise an air-core inductor.

The diode may comprise a Schottky diode.

The first capacitor and first inductor may be electrically connected in series. The second capacitor and second inductor may be electrically connected in series. The first switching element may be electrically connected between the first capacitor and first inductor in parallel. The second switching element may be electrically connected between the second capacitor and second inductor in parallel. The first capacitor may be electrically connected to a terminal of a coil for receiving power wirelessly via inductive coupling. The second capacitor may be electrically connected to another terminal of a coil for receiving power wirelessly via inductive coupling. The first and second switching elements may be electrically connected to a tap of a coil for receiving power wirelessly via inductive coupling.

The differential rectifier may further comprise a capacitor electrically connected to one of the first and second switching elements in parallel. The capacitor may dampen or reduce voltage ringing at the rectifier. Voltage ringing may negatively impact power transfer as the load does not receive a stable power signal. Accordingly, reducing or dampening voltage ringing may improve power signal stability received at the load.

The capacitor may have a capacitance equal to 0.175 divided by the frequency of operation multiplied by an output load. The frequency of operation may be a frequency of operation of the differential rectifier. In other words, the capacitance of the capacitor may be given by the following formula:

$$C_2 = \frac{0.175}{\omega R_{LOAD}}$$

The rectifier may be a passive rectifier.

The rectifier may be current-driven. AC current input to the rectifier, i.e. output by a receiving coil, may have a constant amplitude regardless of load.

As the rectifier is current-driven, the rectifier may provide a constant DC current independent of load. As the output of the rectifier is a constant DC current, no DC/DC converter may be necessary between the rectifier and a load. This may result in reduced space requirements making the rectifier suitable for particular applications or a wider range of applications.

According to another aspect there is provided a receiver for use in a wireless power transfer system, the receiver for receiving power via inductive coupling.

The receiver may comprise any of the described differential rectifiers.

The receiver may further comprise a coil for extracting power from a generated field via inductive coupling.

The coil may comprise at least two windings, an outer turn of a first winding and an inner turn of a second winding forming a first sub-coil of the coil, and an inner turn of the first winding and an outer turn of the second winding forming a second sub-coil of the coil.

A winding is understood to comprise both an outer turn and an inner turn. Further a winding may comprise one or more turns between the inner and outer turns. For example, a winding may be defined by an outer turn, n number of turns, and an inner turn.

A turn is understood as defining a circumferential loop or path around an encircled area or volume.

The coil may comprise more than two windings. Each winding may comprise more than two turns, such as for example 4, 6, 8, or more turns. Turns may be interconnected such that turns are mirrored about a central axis of a plane defined by the windings. For example, if 4 turns are present, the first turn may be connected to the third turn, and the second turn connected to the fourth turn.

The coil may be generally planar. In other words, the turns of the windings of the coil may be in the same plane. One of skill in the art will recognize that while the windings are generally in the same plane, portions of the windings may be out of the plane to connect turns. For example, windings may be within the same layer of a printed circuit board (PCB) while the turns are connected in an adjacent layer of the same PCB.

The coil may comprise a first sub-coil comprising an outer turn of a first winding of the coil and an outer turn of a second winding of the coil, and a second sub-coil comprising an inner turn of the first winding and an inner turn of the second winding.

A first terminal may be formed at a termination of the outer or inner turn of the first winding and a second terminal is formed at a termination of the outer or inner turn of the second winding.

A tap or third terminal may be formed between the first and second terminal to split the coil into the first-sub coil and the second sub-coil. The tap may be at an approximate centre of the coil, i.e., a centre tap.

The first and second switching elements of the differential rectifier may be electrically connected to the tap.

The first inductor may be electrically connected to the first terminal. The first capacitor may be electrically connected to the first terminal.

The second inductor may be electrically connected to the second terminal. The second capacitor may be electrically connected to the second terminal.

The second capacitor and second inductor may be electrically connected in series with the second switching element electrically connected between the second capacitor and second inductor in parallel.

The first capacitor and first inductor may be electrically connected in series with the first switching element electrically connected between the first capacitor and first inductor in parallel.

The second inductor may comprise a second iron-core or air-core inductor.

The second switching element may comprise a switch such as an active switch, a diode such as a Schottky diode, or a FET.

The coil may comprise at least two windings, an outer turn of a first winding and an inner turn of a second winding forming a first sub-coil of the coil, and an inner turn of the first winding and an outer turn of the second winding forming a second sub-coil of the coil, wherein a first terminal is formed at a termination of the outer or inner turn of the first winding and a second terminal is formed at a termination of the outer or inner turn of the second winding, and wherein a tap is formed between the first and second terminal to split the coil into the first-sub coil and the second cub-coil, the tap electrically connected to ground.

At least one winding may comprise one or more additional turns between an inner turn and an outer turn. The winding may comprise n additional turns between the inner and outer turns, where n is a positive integer of 1 or greater.

The coil may comprise one or more additional windings. The coil may comprise n additional windings, where n is a positive integer of 1 or greater.

The receiver may further comprise at least one additional inductor electrically connected to the one of the terminals or tap of the coil. The additional inductor(s) may beneficially minimize distortion and/or improve performance of the rectifier.

The additional inductor may be electrically connected to the first terminal, second terminal or tap of the coil.

The diodes may cause distortion when in the off state. The distortion may include additional $2^{nd}$ and/or $3^{rd}$ order harmonics. As a consequence of the distortion the rectifier may no longer be able to generate the required output current, i.e., the current may be smaller or larger than required by a load.

The additional inductor may minimise distortion and therefore reduce its impact on rectifier performance. The value of the inductance of the inductor may be selected based on the diodes' junction capacitance. The value may be up to 100 nH.

The receiver may further comprise a third inductor electrically connected to the first terminal of the coil, and a fourth inductor electrically connected to the second terminal of the coil. The third and fourth inductors may introduce inductive impedance which negates part of the capacitive impedance of the switch elements' (diodes') non-linear junction capacitance.

The additional inductors, e.g., third and fourth inductors, may minimise distortion and therefore reduce its impact on rectifier performance. The additional inductors introduce impedance which negates part of the capacitive impedance of the diodes' non-linear junction capacitance. The values of the inductances of the additional inductors depends on the value of the diodes' junction capacitance. The value may be up to 100 nH.

The additional inductors may introduce power losses. Accordingly, a single additional inductor electrically connected to the tap of the coil may result in reduced power loss, while still minimising distortion and reducing its impact on rectifier performance.

Accordingly, the receiver may comprise a third inductor electrically connected to the tap of the coil.

The rectifier may be a synchronous rectifier.

The rectifier may further comprise a first transistor electrically connected to the tap of the coil and the first terminal of the coil; and a second transistor electrically connected to the tap of the coil and the second terminal of the coil.

The rectifier may further comprise a first signal generator electrically connected to the first transistor for generating a pulse signal to drive the first transistor; and a second signal generator electrically connected to the second transistor for generating a pulse signal to drive the second transistor.

The rectifier may further comprise a first delay line or first RC delay circuit electrically connected to the first terminal of the coil, the first delay line for synchronizing operation of the first transistor; and a second delay line or second RC delay circuit electrically connected to the second terminal of the coil, the second delay line for synchronizing operation of the second transistor.

Synchronizing operation of the first and/or second transistor may comprise delaying an output from the coil.

The receiver may further comprise a load electrically connected to the rectifier.

The receiver may further comprise a capacitor electrically connected in parallel between the inductor and load, the capacitor for filtering a power signal output by the rectifier.

The receiver may further comprise a shield positioned adjacent the coil for protecting the coil from electrical interference.

The shield may be configured to add capacitance to the coil.

A position of the tap or third terminal along the coil may be based on a distance of the shield from the coil, and by the dimensions and geometry of the coil and shield.

According to another aspect there is provided a coil in a wireless power transfer system for transferring power via inductive coupling.

The coil may comprise a first sub-coil comprising an outer turn of a first winding of the coil and an outer turn of a second winding of the coil, and a second sub-coil comprising an inner turn of the first winding and an inner turn of the second winding.

The coil may comprise an outer turn of a first winding and an inner turn of a second winding forming a first sub-coil of the coil, and an inner turn of the first winding and an outer turn of the second winding forming a second sub-coil of the coil, wherein a first terminal is formed at a termination of the outer or inner turn of the first winding and a second terminal is formed at a termination of the outer or inner turn of the second winding, and wherein a tap is formed between the first and second terminal to split the coil into the first-sub coil and the second cub-coil, the tap electrically connected to ground.

A winding is understood to comprise both an outer turn and an inner turn. Further a winding may comprise one or more turns between the inner and outer turns. For example, a winding may be defined by an outer turn, n number of turns, and an inner turn.

A turn is understood as defining a circumferential loop or path around an encircled area or volume.

The coil may comprise more than two windings. Each winding may comprise more than two turns, such as for example 4, 6, 8, or more turns. Turns may be interconnected such that turns are mirrored about a central axis of a plane defined by the windings. For example, if 4 turns are present, the first turn may be connected to the third turn, and the second turn connected to the fourth turn.

The coil may be generally planar. In other words, the turns of the windings of the coil may be in the same plane. One of skill in the art will recognize that while the windings are generally in the same plane, portions of the windings may be out of the plane to connect turns. For example, windings may be within the same layer of a printed circuit board (PCB) while the turns are connected in an adjacent layer of the same PCB.

The tap may be a centre tap splitting the coil into approximate half coils. The first sub-coil may form a first half-coil. The second sub-coil may form a second half-coil.

The first and second sub-coils may be electrically balanced.

A capacitance of the first sub-coil may be approximately equal to a capacitance of the second sub-coil.

The outer turn of the first winding may at least partially overlap the outer turn of the second winding.

The inner turn of the first winding may at least partially overlap the inner turn of the second winding.

At least one winding may comprise one or more additional turns between an inner turn and an outer turn. The winding may comprise n additional turns between the inner and outer turns, where n is a positive integer of 1 or greater.

The coil may comprise one or more additional windings. The coil may comprise n additional windings, where n is a positive integer of 1 or greater.

The coil may further comprise a shield positioned adjacent the coil for protecting the coil from electrical interference.

The shield may be configured to add capacitance to the coil.

The sub-coils may be physically identical. The sub-coils may be non-identical. The sub-coils may have the same number of turns, or different numbers of turns.

A position of the tap or third terminal along the coil may be based on a distance of the shield from the coil, and by the dimensions and geometry of the coil and shield.

According to another aspect there is provided a load independent inverter. The inverter may be adapted to provide a constant output voltage (constant amplitude and phase) regardless of load. The inverter may be suitable for use with the described coil, rectifier, and receiver. The rectifier may provide a constant DC current and therefore provide improved compatibility with an inverter which provides a constant output voltage.

The inverter may comprise a switched mode zero-voltage switching (ZVS) amplifier comprising: a pair of circuits comprising: at least a transistor and at least a capacitor arranged in parallel; and at least an inductor arranged in series with the transistor and capacitor; only one ZVS inductor electrically connected to the pair of circuits; an impedance transformation stage electrically connected to the ZVS inductor; and at least one capacitor electrically connected to the impedance transformation stage and arranged in series with at least an inductor and at least a resistor.

The inverter may have a constant current output.

According to another aspect there is provided a system for wireless power transfer, the system comprising: a receiver comprising any of the described coils, and any of the described differential rectifiers electrically connected to the coil; and a transmitter comprising any of the described coils; and the described inverter electrically connected to the coil of the transmitter, the coils of the transmitter and receiver adapted to inductively couple to transfer power from the transmitter to the receiver.

The receiver may additionally comprise a load electrically connected to the rectifier.

The transmitter may additionally comprise a power source electrically connected to the inverter.

According to another aspect there is provided a method of rectifying a power signal received at a receiver of a wireless power transfer system. The method may provide a constant DC current independent of load. As the output is a constant DC current, no DC/DC converter may be necessary. Thus, the method may provide a method of rectifying a power signal which requires reduced space.

The method may comprise extracting power from a generated field via inductive coupling at a coil to generate an AC power signal; and rectifying, with a differential rectifier, the AC power signal, the differential rectifier comprising first and second capacitors; first and second switching elements; and first and second inductors, the first capacitor and first inductor electrically connected in series, and the second capacitor and second inductor electrically connected in series; the first switching element electrically connected between the first capacitor and first inductor in parallel, and the second switching element electrically connected between the second capacitor and second inductor in parallel; the first capacitor electrically connected to a terminal of the coil, and the second capacitor electrically connected to another terminal of the coil; and the first and second switching elements electrically connected to a tap of the coil.

According to another aspect there is provided a method for manufacturing a rectifier for use in a receiver, the method comprising: integrating or manufacturing a circuit forming the rectifier, the circuit a differential rectifier comprising first and second capacitors; first and second switching elements; and first and second inductors, the first capacitor and first inductor electrically connected in series, and the second capacitor and second inductor electrically connected in series; the first switching element electrically connected between the first capacitor and first inductor in parallel, and the second switching element electrically connected between the second capacitor and second inductor in parallel; the first capacitor electrically connected to a terminal of a coil for receiving power wirelessly via inductive coupling, and the second capacitor electrically connected to another terminal of a coil for receiving power wirelessly via inductive coupling; and the first and second switching elements electrically connected to a tap of a coil for receiving power wirelessly via inductive coupling The circuit may be manufactured by additive manufacturing. A common example of additive manufacturing is three-dimensional (3D) printing; however, other methods of additive manufacturing are available. Rapid prototyping or rapid manufacturing are also terms which may be used to describe additive manufacturing processes.

As used herein, additive manufacturing refers generally to manufacturing processes wherein successive layers of material(s) are provided on each other to "build-up" layer-by-layer or "additively fabricate", a three-dimensional component. This is compared to some subtractive manufacturing methods (such as milling or drilling), wherein material is successively removed to fabricate the part. The successive layers generally fuse together to form a monolithic component which may have a variety of integral sub-components. In particular, the manufacturing process may allow an example of the subject disclosure to be integrally formed and include a variety of features not possible when using prior manufacturing methods.

Additive manufacturing methods described herein enable manufacture to any suitable size and shape with various features which may not have been possible using prior manufacturing methods. Additive manufacturing can create complex geometries without the use of any sort of tools, molds, or fixtures, and with little or no waste material. Instead of machining components from solid billets of plastic or metal, much of which is cut away and discarded, the only material used in additive manufacturing is what is required to shape the part.

Suitable additive manufacturing techniques in accordance with the subject disclosure include, for example, Fused Deposition Modeling (FDM), Selective Laser Sintering (SLS), 3D printing such as by Stereolithography (SLA), Direct Selective Laser Sintering (DSLS), Electron Beam Sintering (EBS), Electron Beam Melting (EBM), Laser Engineered Net Shaping (LENS), Electron Beam Additive Manufacturing (EBAM), Laser Net Shape Manufacturing (LNSM), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), Drop On Demand (DOD), Binder Jetting (BJ), Multi Jet Fusion (MJF), Laminated Object Manufacturing (LOM) and other known processes.

The additive manufacturing processes described herein may be used for forming components using any suitable material.

As noted above, the additive manufacturing process disclosed herein allows a single component to be formed from multiple materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Additive manufacturing processes typically fabricate components based on 3D information, for example a three-dimensional computer model (or design file), of the component.

Design files can take any now known or later developed file format. For example, design files may be in the Stereolithography or "Standard Tessellation Language" (.stl) format, which was created for stereolithography CAD programs of 3D Systems, or the Additive Manufacturing File (.amf) format, which is an American Society of Mechanical Engineers (ASME) standard and which is an extensible markup-language (XML) based format designed to allow any CAD software to describe the shape and composition of any three-dimensional object to be fabricated on any additive manufacturing printer.

Further examples of design file formats include AutoCAD (.dwg) files, Blender (.blend) files, Parasolid (.x_t) files, 3D Manufacturing Format (.3mf) files, Autodesk (3ds) files, Collada (.dae) files and Wavefront (.obj) files, although many other file formats exist.

Design files can be produced using modelling (e.g., CAD modelling) software and/or through scanning the surface of a product to measure the surface configuration of the product.

Once obtained, a design file may be converted into a set of computer executable instructions that, once executed by a processer, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator, or owner of the additive manufacturing system, or from other sources. An additive manufacturing system may execute the instructions to fabricate the product using any of the technologies or methods disclosed herein.

Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the product can be used to physically generate the object, upon execution of the code or instructions by an additive manufacturing system. For example, the instructions may include a precisely defined 3D model of the product and can be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component.

Accordingly, by controlling an additive manufacturing apparatus according to the computer executable instructions, the additive manufacturing apparatus can be instructed to print out one or more parts of the rectifier or receiver. These can be printed either in assembled or unassembled form. For instance, different portions of the receiver may be printed separately (as a kit of unassembled parts) and then subsequently assembled. Alternatively, the different parts may be printed in assembled form.

In light of the above, embodiments include methods of manufacture via additive manufacturing. This includes the steps of obtaining a design file representing the rectifier or receiver and instructing an additive manufacturing apparatus to manufacture the rectifier or receiver in assembled or unassembled form according to the design file. The additive manufacturing apparatus may include a processor that is configured to automatically convert the design file into computer executable instructions for controlling the manufacture of the rectifier or receiver. In these embodiments, the design file itself can automatically cause the production of the rectifier or receiver once input into the additive manufacturing device. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing device. The instructions are suitable for execution by the processor and for storage on a non-transitory computer readable storage medium.

Although additive manufacturing technology is described herein as enabling fabrication of complex objects by building objects point-by-point, layer-by-layer, typically in a vertical direction, other methods of fabrication are possible and within the scope of the subject disclosure. For example, although the discussion herein refers to the addition of material to form successive layers, one skilled in the art will appreciate that the methods and structures disclosed herein may be practiced with any additive manufacturing technique or other manufacturing technology.

In another aspect there is provided a computer-readable medium comprising instructions that, when executed by a processor, perform any of the described methods. The instructions may operate a controller to perform the described methods. The controller may comprise a proportional-integral-derivative (PID) controller.

In another aspect there is provided a computer-readable medium comprising instructions that, when executed by a processor, cause the processor to control an additive manufacturing apparatus to manufacture any of the described rectifiers, receivers, or coils.

In another aspect there is provided a method of manufacturing a device via additive manufacturing, the method comprising: obtaining an electronic file representing a geometry of a product wherein the product is any of the described receivers, rectifiers, or coils; and controlling an additive manufacturing apparatus to manufacture, over one or more additive manufacturing steps, the product according to the geometry specified in the electronic file.

The method may provide any of the advantages discussed in respect of the described system, and vice versa.

The computer-readable medium may be non-transitory. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The processor may have a single-core processor or multiple core processors composed of a variety of materials, such as silicon, polysilicon, high-K dielectric, copper, and so on.

Given the above, the design and manufacture of implementations of the subject matter and the operations described in the subject disclosure can be realized using digital electronic circuitry, or in computer software, firmware, or hardware, including the rectifier and receiver and their structural equivalents, or in combinations of one or more of them. For instance, hardware may include processors, microprocessors, electronic circuitry, electronic components, integrated circuits, etc. Implementations of the subject matter described in the subject disclosure can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The medium may be a non-transitory computer-readable storage medium.

It should be understood that any features described in relation to one aspect, example or embodiment may also be used in relation to any other aspect, example or embodiment of the subject disclosure. Other advantages of the subject disclosure may become apparent to a person skilled in the art from the detailed description in association with the following drawings.

BRIEF DESCRIPTION OF THE DRAWINGS

Embodiments will now be described more fully with reference to the accompanying drawings in which.

DETAILED DESCRIPTION

Figure 1:
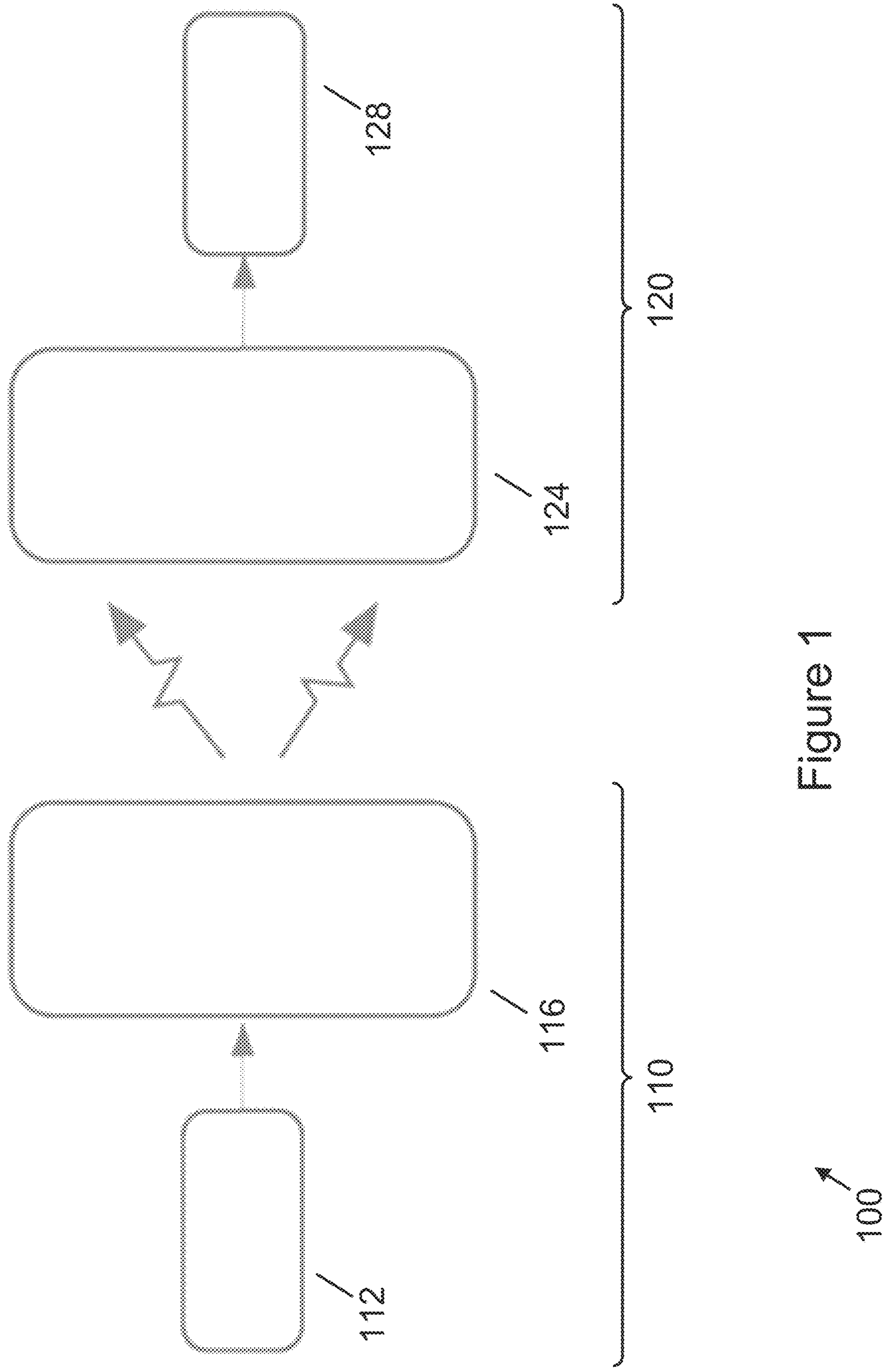
FIG. 1 is a block diagram of a wireless power transfer system.

The foregoing summary, as well as the following detailed description of certain examples will be better understood when read in conjunction with the appended drawings. As used herein, an element or feature introduced in the singular and preceded by the word “a” or “an” should be understood as not necessarily excluding the plural of the elements or features. Further, references to “one example” or “one embodiment” are not intended to be interpreted as excluding the existence of additional examples or embodiments that also incorporate the described elements or features. Moreover, unless explicitly stated to the contrary, examples or embodiments “comprising” or “having” or “including” an element or feature or a plurality of elements or features having a particular property may include additional elements or features not having that property. Also, it will be appreciated that the terms “comprises”, “has”, “includes” means “including but not limited to” and the terms “comprising”, “having” and “including” have equivalent meanings. It will also be appreciated that like reference characters will be used to refer to like elements throughout the description and drawings.

As used herein, the terms “adapted” and “configured” mean that the element, component, or other subject matter is designed and/or intended to perform a given function. Thus, the use of the terms “adapted” and “configured” should not be construed to mean that a given element, component, or other subject matter is simply “capable of” performing a given function but that the element, component, and/or other subject matter is specifically selected, created, implemented, utilized, and/or designed for the purpose of performing the function. It is also within the scope of the subject application that elements, components, and/or other subject matter that is described as being adapted to perform a particular function may additionally or alternatively be described as being configured to perform that function, and vice versa. Similarly, subject matter that is described as being configured to perform a particular function may additionally or alternatively be described as being operative to perform that function.

It will be understood that when an element is referred to as being “on,” “attached” to, “connected” to, “coupled” with, “contacting,” etc., another element, it can be directly on, attached to, connected to, coupled with or contacting the other element or intervening elements may also be present.

It should be understood that use of the word “exemplary”, unless otherwise stated, means ‘by way of example’ or ‘one example’, rather than meaning a preferred or optimal design or implementation.

Turning now to FIG. 1, a wireless power transfer system generally identified by reference numeral 100 is shown. The wireless power transfer system 100 comprises a transmitter 110 comprising a power source 112 electrically connected to a transmit element 116, and a receiver 120 comprising a receive element 124 electrically connected to a load 128. Power is transferred from the power source 112 to the transmit element 116. The power is then transferred from the transmit element 116 to the receive element 124 via resonant or non-resonant electric or magnetic field coupling. The power is then transferred from the receive element 124 to the load 128. Exemplary wireless power transfer systems 100 include a high frequency inductive wireless power transfer system as described in Applicant’s U.S. Patent Application Publication No. 2021/0083634, or a resonant capacitively coupled wireless power transfer system as described in Applicant’s U.S. Pat. No. 9,653,948, the relevant portions of which are incorporated herein by reference.

Figure 2:
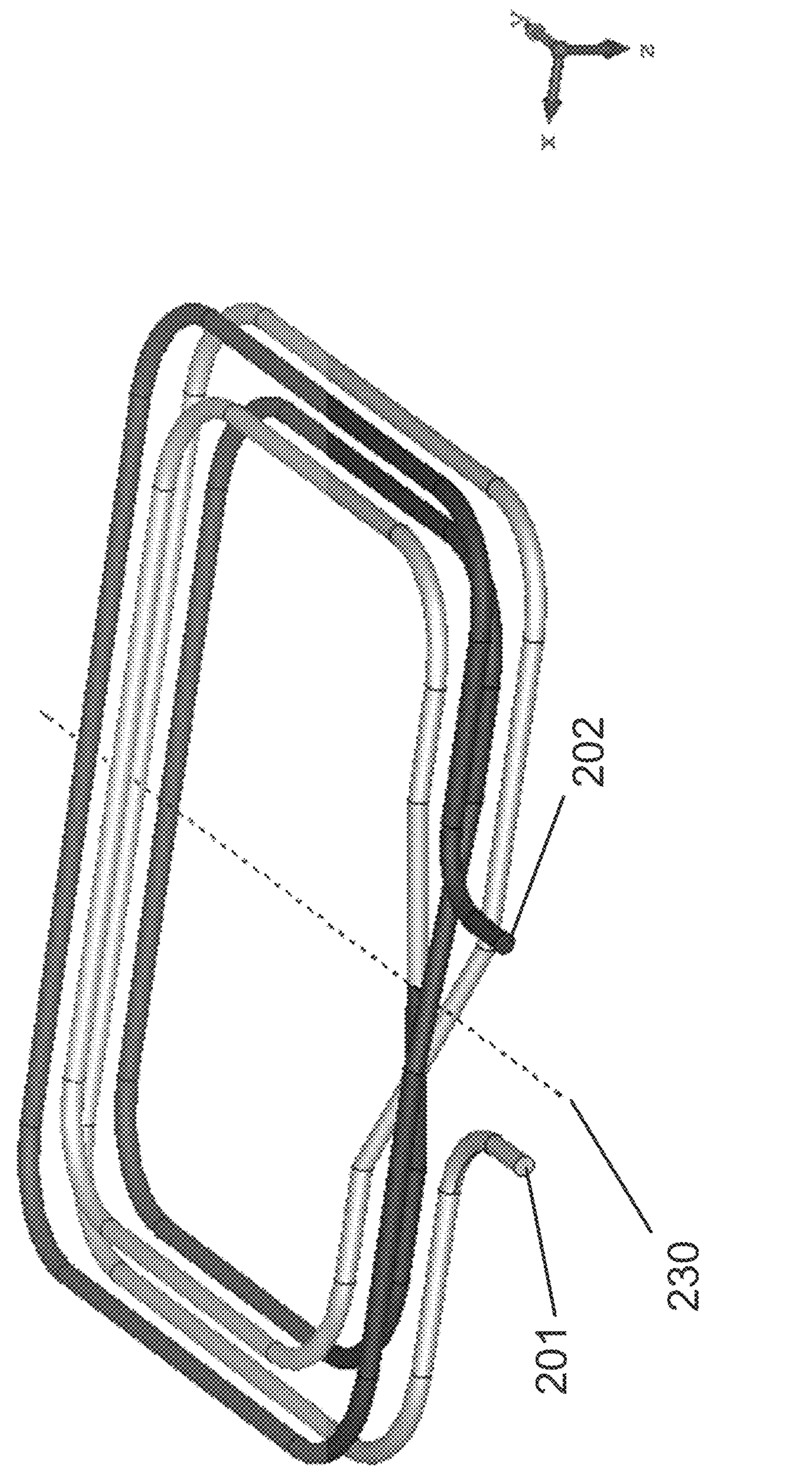
FIG. 2 is a perspective view of a coil for use in a wireless power transfer system.

In resonant or non-resonant magnetic field (inductive) power transfer systems, the transmit element 116 and receive element 124 each comprise a coil. The coils form magnetic coupled inductors through which a power signal is transferred/extracted. An exemplary coil is depicted in FIG. 2 and generally identified by reference numeral 200. The coil 200 generally comprises a length of wire arranged in generally concentric rings. In the illustrated arrangement the coil 200 is a non-planar coil for an inductive (magnetic field coupling) wireless power transfer system. The coil 200 is symmetric along a plane 230.

In particular, the coil 200 comprises at least two turns of wire connected in series. The turns are either inner turns or outer turns. In the illustrated arrangement the symmetric non-planar coil 200 comprises four turns. Two of the turns are outer turns, and two turns are inner turns. The coil 200 has two terminals, namely a first terminal 201 and a second terminal 202. The terminals are positioned at either end of the wire forming the coil 200.

Figure 3:
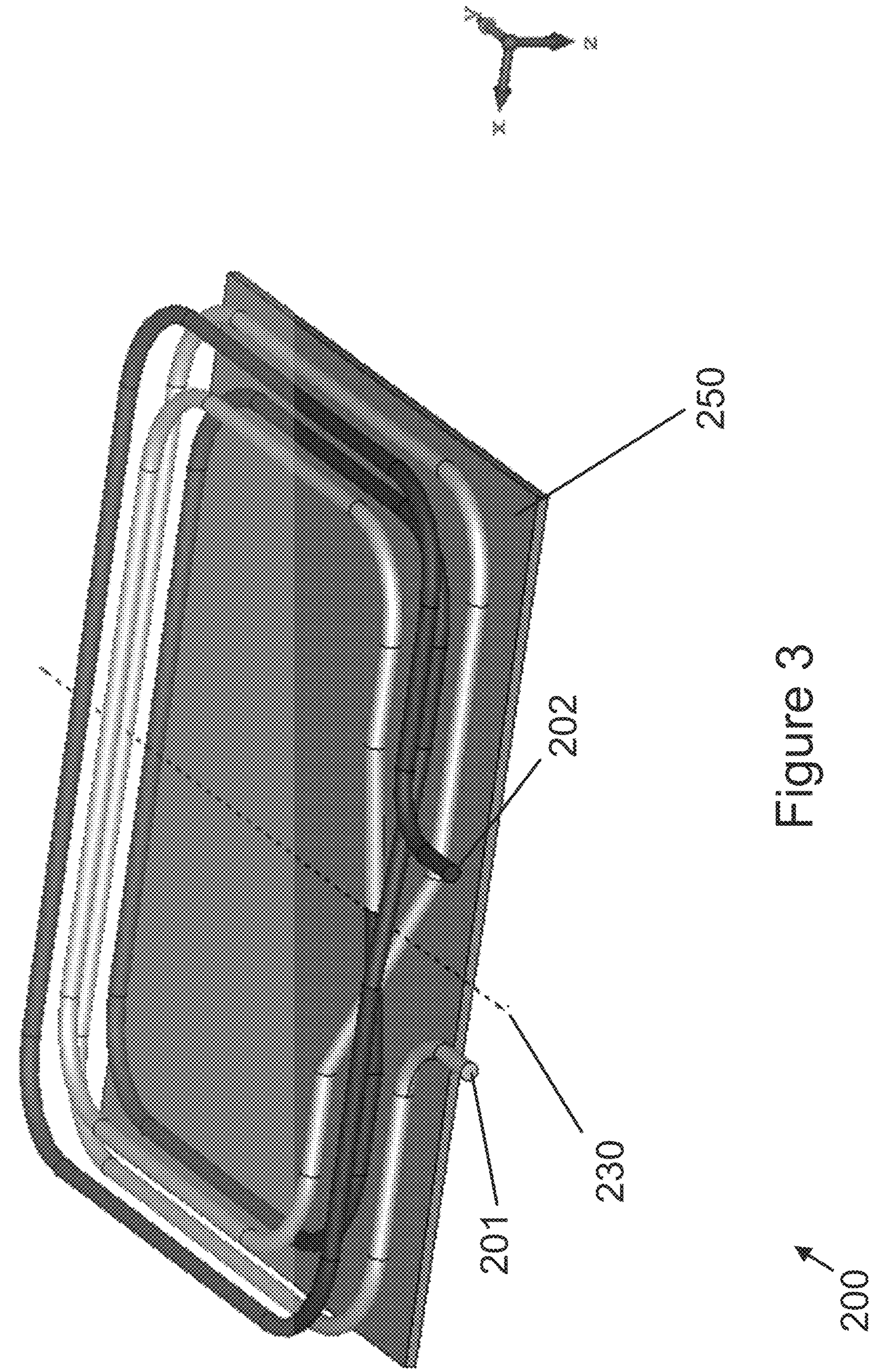
FIG. 3 is a perspective view of the coil of FIG. 2 with a shield.

As shown in FIG. 3, the coil 200 may be used in conjunction with a shield 250. The shield 250 may comprise the passive electrode as described in Applicant’s U.S. Pat. No. 11,139,690, the relevant portions of which are incorporated herein by reference. As illustrated in FIG. 3 a plane formed by the major surface of the shield 250 is generally parallel to a plane formed by a major surface of the coil 200. In other words, the shield 250 is parallel to the coil 200. The shield 250 is positioned in close proximity to the coil 200. The shield 250 is said to encompass the coil 200 to at least partially eliminate environmental influences affecting the coil.

For the purposes of the subject disclosure, the shield 250 is said to encompass the coil 200 when at least one of the following: (i) if the area defined by the perimeter of the coil 200 is projected onto the area of the shield 250, the projection is entirely within the area of the shield 250; (ii) the projected area of the coil 200 is circumscribed by the area of the shield 250; and (iii) the area of the shield 250 is greater than the total area defined by the perimeter of the coil 200 by at least the inner area defined by the inner turns of the coil 200.

In use the shield 250 may increase the capacitance of the wireless power transfer system 100. The shield 250 may decrease the inductance required to achieve resonance.

Figure 4:
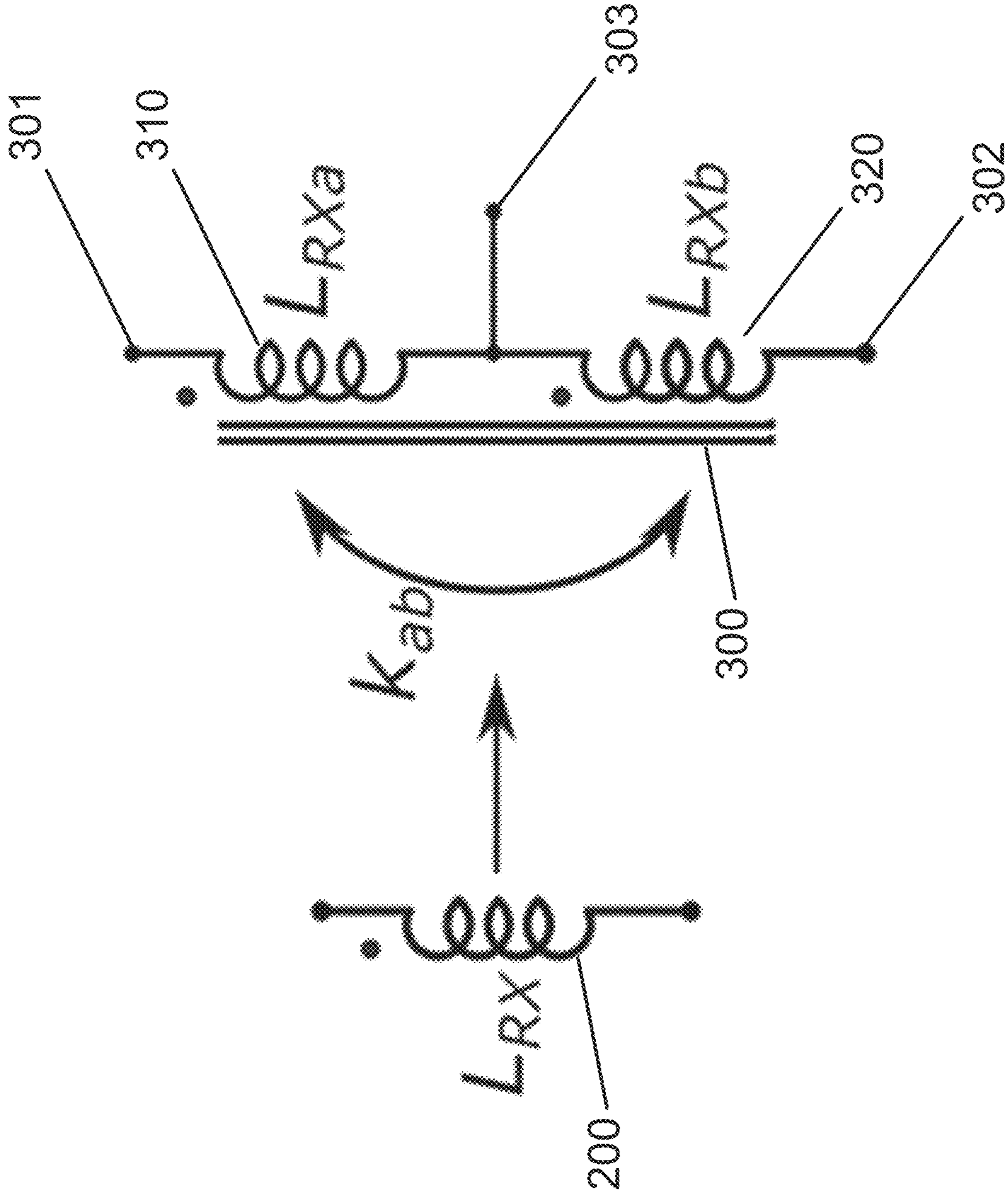
FIG. 4 is a schematic diagram illustrating tapping of the coil of FIG. 2.

While particular coils 200 have been described, it may be advantageous to provide an alternate coil which is split or tapped. Tapping a coil generally refers to adding an additional terminal to the coil intermediate the end points or terminals of the coil. The additional terminal forms a third terminal referred to as a tap. The process of tapping the coil 200 is illustrated in FIG. 4. The coil 200 is tapped to form the coil 300 which has terminals 301, 302 at end points thereof, and a third terminal or tap 303 intermediate the first and second terminals 301, 302. The terminals 301, 302, 303 may be connected to components of the receiver 120 as will be described.

In the illustrated arrangement the tap 303 is positioned at an approximate midpoint of the coil 300 thereby forming a centre-tap. The process of forming such a tap is referred to as centre-tapping. The tap 303 equally splits the coil 300 into two equally balanced sub-coils 310, 320. The sub-coils 310, 320 are electrically coupled to each other at the tap 303 and electrically balanced.

Figure 5A:
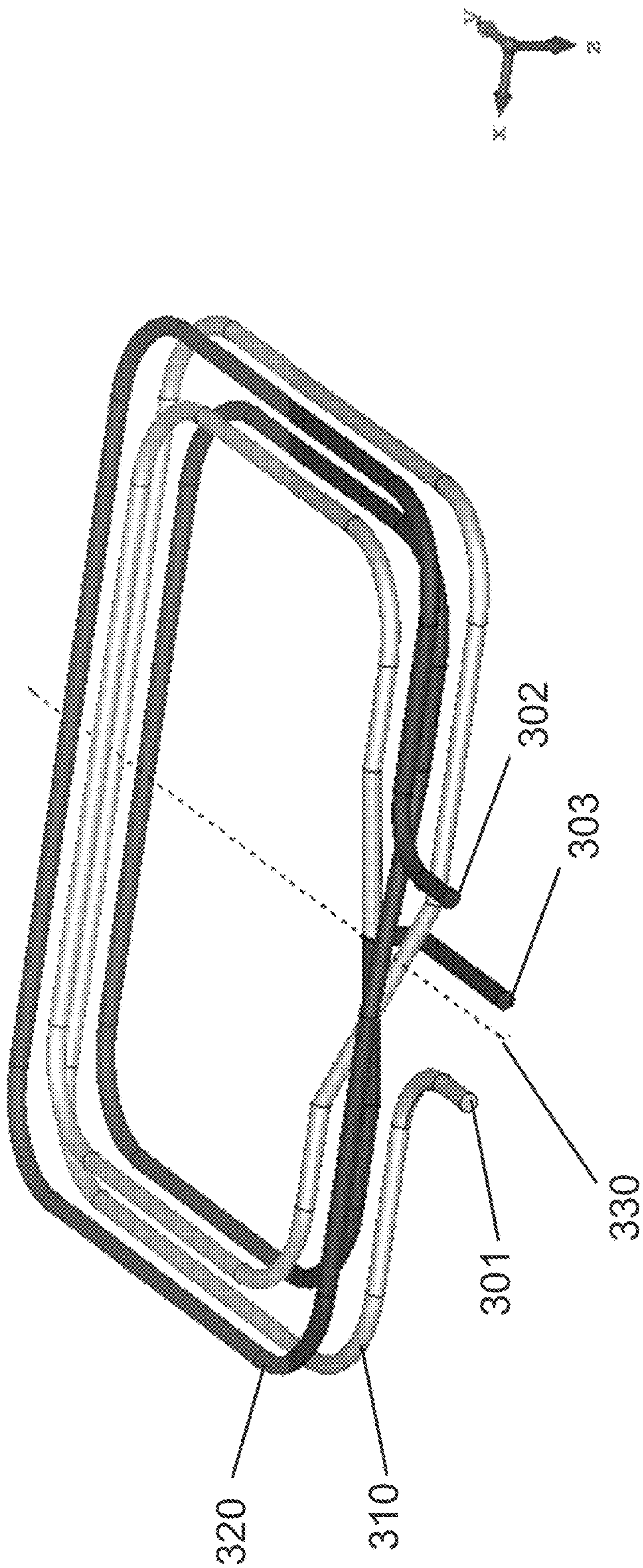
FIG. 5*a* is a perspective view of another embodiment of a coil for use in a wireless power transfer system.
Figure 5B:
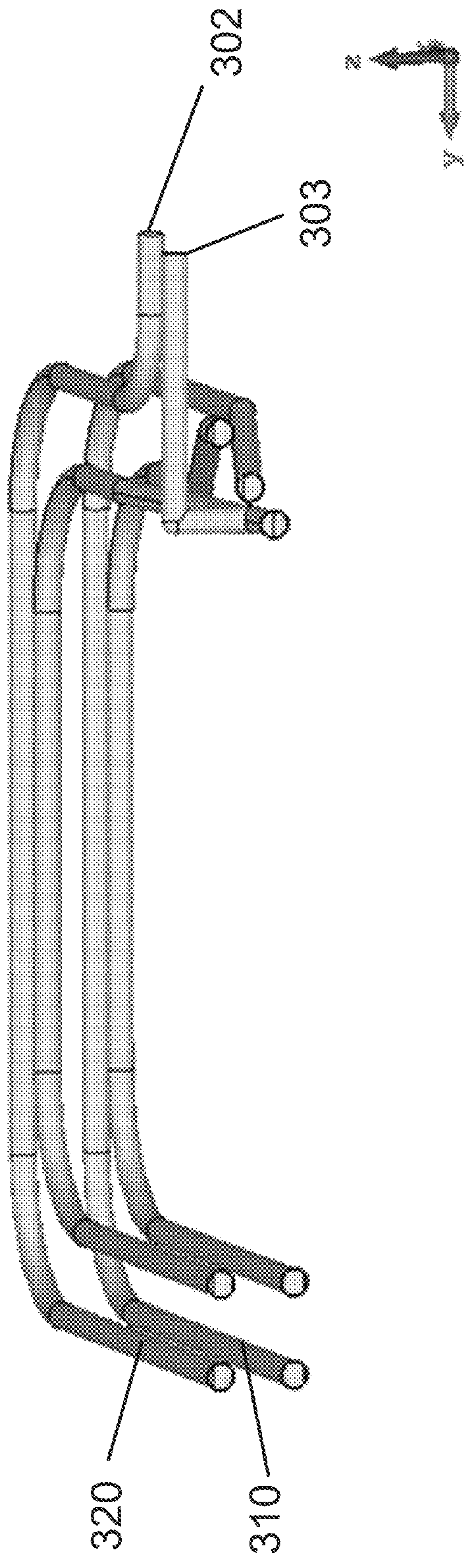
FIG. 5*b* is a cross-sectional perspective view of a portion of the coil of FIG. 5*a;*

The coil 300 is further illustrated in FIGS. 5*a* and 5*b*. In the illustrated arrangement the coil 300 comprises two windings, namely a first winding comprising an outer turn and an inner turn, and a second winding comprising an inner turn and an outer turn.

A turn is understood as defining a circumferential loop or path around an encircled area or volume.

In the illustrated arrangement the first sub-coil 310 comprises an outer turn of a first winding and an inner turn of a second winding. The second sub-coil 320 comprises an inner turn of the first winding and an outer turn of the second winding.

The first terminal 301 is located at a termination of the outer turn of the first winding, and the second terminal 302 is located at a termination of the outer turn of the second winding. The tap 303 is located between the first and second terminals 301, 302. While not illustrated, in use, the tap 303 is electrically connected to ground.

FIG. 5*b* is a cross-sectional perspective view of the coil 300 taken along line 330.

The centre tap 303 effectively splits the non-planar coil 300 into the sub-coils 310, 320, which in theory are electrically balanced (equal capacitance).

Although the word "centre" in centre-tapped non-planar coil 300 and the associated illustrations may indicate that the tap 303 physically splits the non-planar coil 200 from FIGS. 2 and 3, into a centre tapped non-planar coil 300, comprising two identical and symmetrical coils 310 and 320, this is not necessarily true. The third terminal 303, or tap, is positioned such that the two sub-coils 310 and 320 are electrically identical (i.e., have the same inductance, $L_{RXa}=L_{RXb}$). The two electrically identical sub-coils 310 and 320 of the coil 300 may or may not be physically identical and/or symmetrical. It may be that one sub-coil is physically non-identical to the other sub-coil.

For example, one sub-coil may be larger and/or have more turns than the other sub-coil, or vice versa. The exact position of the third terminal or tap 303 is determined based on the dimensions and geometry of the coil 300.

As identified in the schematic of FIG. 4, the inductance of the coil 200 prior to tapping is given as $L_{RX}$ while the inductance of the sub-coils 310, 320 is given as $L_{RXa}$ and $L_{RXb}$, respectively. The location of the tap 303 may be selected such that inductance of each coil 310, 320 is equal, i.e. $L_{RXa}=L_{RXb}$. The coupling factor between the coils 310, 320 is given as $k_{ab}$. Equations 1 and 2 below describe the relationship between $L_{RX}$, $L_{RXa}$ and $L_{RXb}$:

$$L_{RX} = L_{RXa} + L_{RXb} + 2M_{ab} \quad \text{(Equation 1)}$$

$$M_{ab} = k_{ab}\sqrt{L_{RXa}L_{RXb}} \quad \text{(Equation 2)}$$

where $M_{ab}$ is the mutual inductance between the sub-coils 310, 320, and $k_{ab}$ is the coupling coefficient of the sub-coils 310, 320.

The schematic of FIG. 4 uses the dot convention which indicates the coupling coefficient $k_{ab}$ is positive.

While a specific embodiment of the centre-tapped non-planar coil 300 has been shown, other configurations are also possible. For example, in another embodiment the turns of the first sub-coil 210 and the second sub-coil 220 are in the same plane, referred to as a planar centre-tapped coil. Using a planar version of the centre-tapped coil 300 has benefits of requiring less volume and therefore enabling the size of the associated transmitter or receiver to be decreased overall.

Figure 6A:
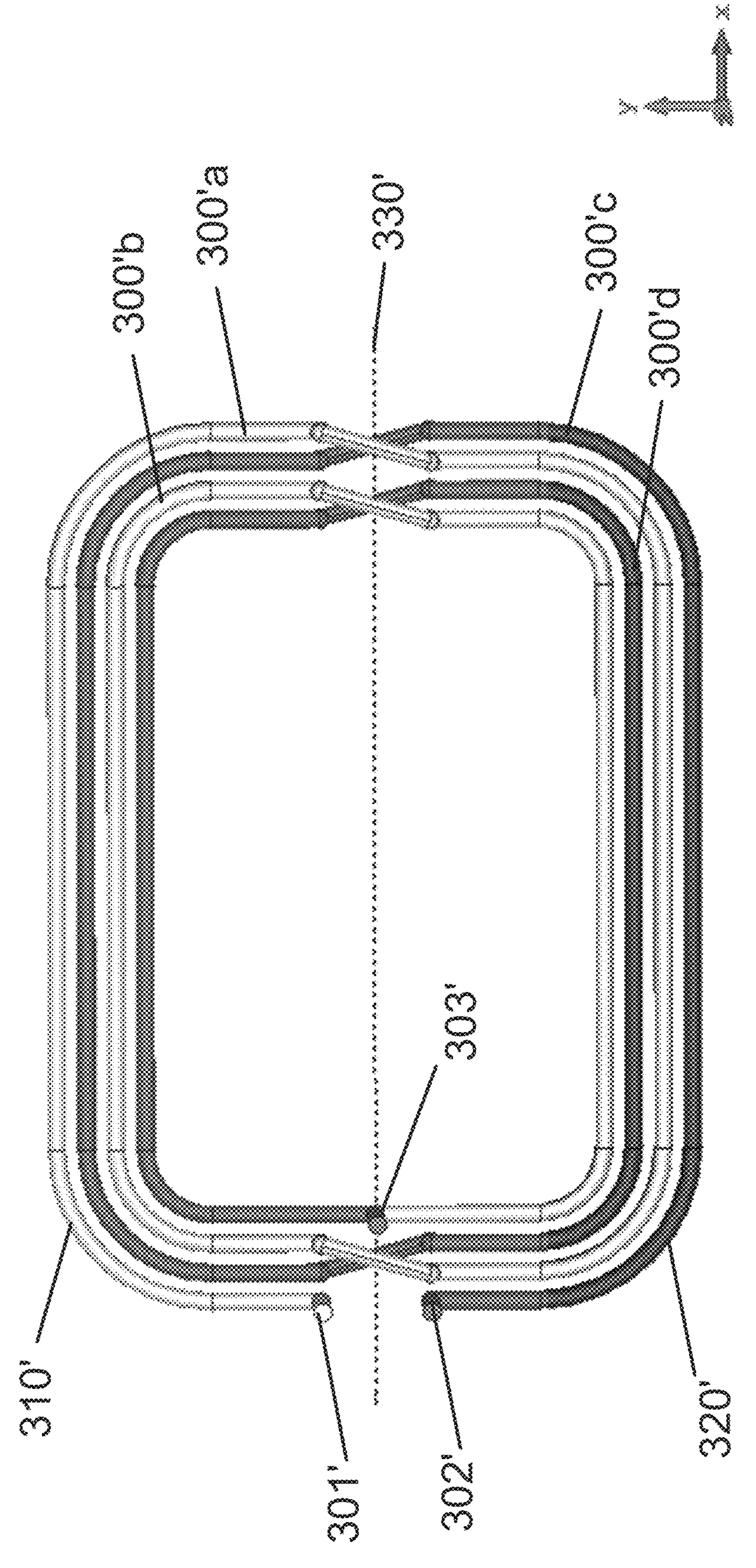
FIG. 6*a* is a plan view of another embodiment of a coil for use in a wireless power transfer system.
Figure 6C:
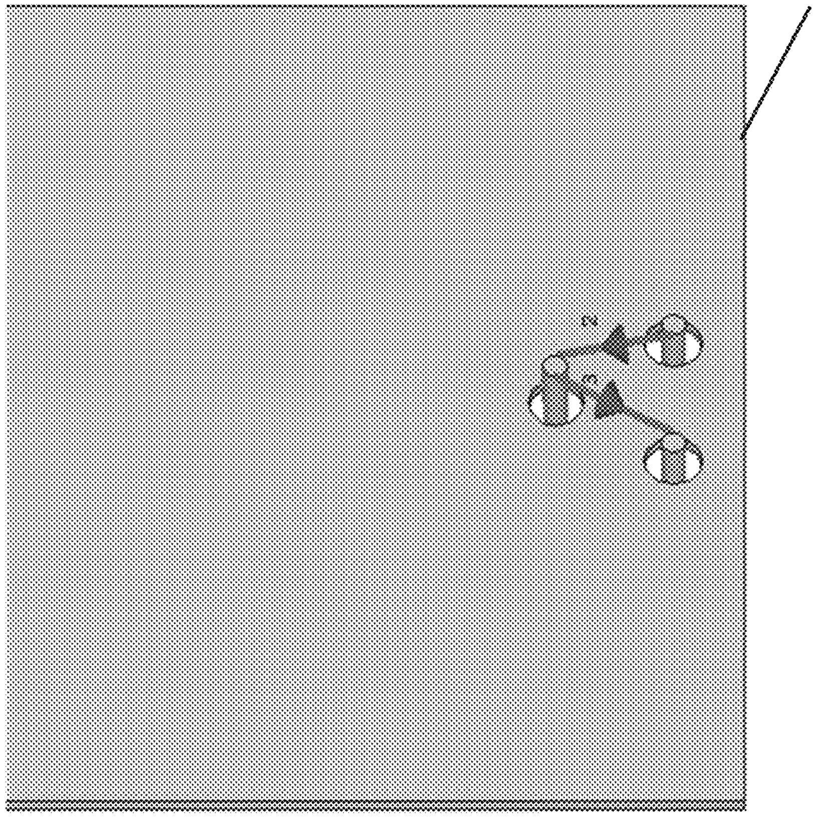
FIG. 6*c* is a perspective view of the coil of FIG. 6*a* with a shield.
Figure 6B:
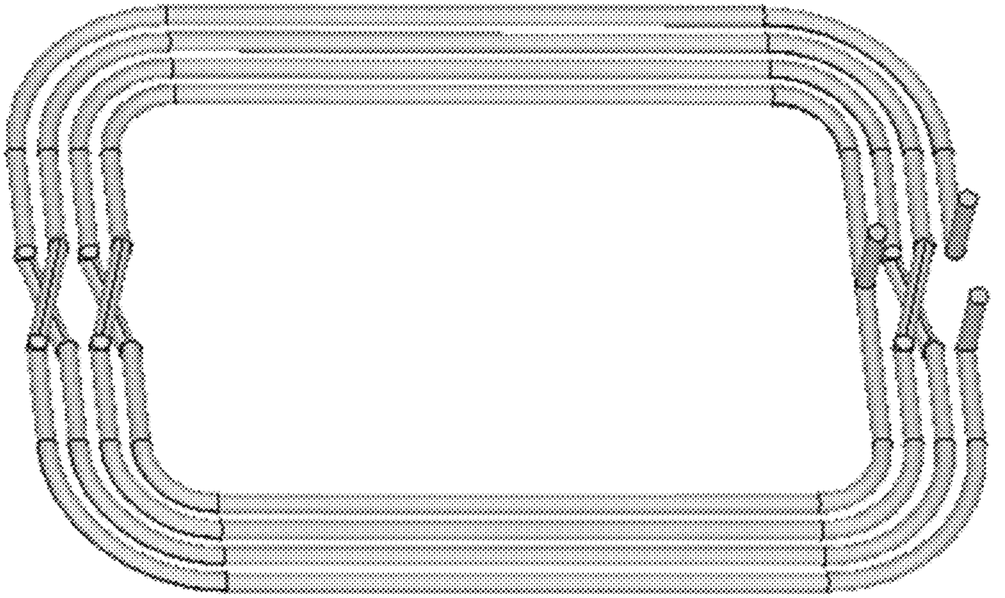
FIG. 6*b* is a perspective view of the coil of FIG. 6*a;*

Turning now to FIGS. 6*a* and 6*b*, a planar centre-tapped coil 300' is illustrated. The coil 300' comprises all of the elements of the described coil 300 with reference symbols suffixed with an "'".

The planar centre-tapped coil 300' comprises at least two turns in the same plane, and three terminals 301', 302', 303'. The coil 300' comprises two windings. In the illustrated arrangement, the coil 300' comprises four turns equally spaced by air-gaps between the turns, with a first terminal 301' at one end of the coil 300', and a second terminal 302' at the opposite end of the coil 300'. Each winding has two turns. A third terminal or tap 303' is located at tapping point on the inner turn of the coil 300'. Like the previously described two-layer non-planar coil 300, the third terminal or tap 303', electrically divides the coil 300' into two electrically balanced sub-coils, 310', 320'.

Unlike the non-planar coil 300 with sub-coils 310, 320, the sub-coils 310', 320' of the planar coil 300' are visually indistinguishable due to their planar arrangement. The first sub-coil 310' of the planar coil 300' begins at the first terminal 301' and terminates at the third terminal or tap 303'. Similarly, the second sub-coil 320' of the planar coil 300' begins are the second terminal 302' and terminates at the third terminal or tap 303'. As illustrated in FIGS. 6*a* and 6*b* the terminals 301', 302', 303' extend in the same direction, which is perpendicular to the plane formed by the turns of the coil 300'.

In the illustrated arrangement a first turn 300'*a* is the outermost turn of the first sub-coil 310'. The first turn 300'*a* is electrically connected or integral with a second turn 300'*b*, which is enclosed by the first turn 300'*a*. In this context, enclosed refers to the first turn 301'*a* at least partially encircling the second turn 300'*b* in the same x-y plane.

A third turn 300'*c* is the outermost turn of the second sub-coil 320'. The third turn 300'*c* is electrically connected or integral with a fourth turn 300'*d*, which is enclosed by the third turn 300'*c*. In this context, enclosed refers to the third turn 300'*c* at least partially encircling the fourth turn 300'*d* in the same x-y plane.

Either the first turn 300'*a* crosses over the third turn 300'*c* at a midpoint thereof, or vice versa. Either the second turn 300'*b* crosses over the fourth turn 300'*d* at a midpoint thereof, or vice versa. The end of the first turn 300'*a*/start of the second turn 300'*b* crosses over the end of the third turn 300'*c*/start of the fourth turn 300'*d*, or vice versa.

The second and fourth turns 300'*b*, 300'*d* are connected at the third terminal or tap 303'.

Turning now to FIG. 6*c* the coil 300' is illustrated with the previously-described shield 250 proximate the coil 300'. The terminals 301', 302', 303' extend through apertures in the shield 250 for electrical connection to other components of the receiver 120 as will be described.

As previously described the first sub-coil 310 and the second sub-coil 320 are electrically coupled to each other, and have an inductance of $L_{RXa}$ and $L_{RXb}$, respectively. Adding the third terminal or tap 303 to the coil 300 may compensate for any electrical imbalance caused by the presence of the shield 250.

The third terminal or tap 303 may not be at the centre of the coil 300. The exact position of the third terminal or tap 303 may be determined based on the distance of the shield 250 from the coil 300, and by the dimensions and geometry of the coil 300 and shield 250 structure. This is because the placement of the shield 250 affects the capacitance of the turns of the coil 300 differently, depending on the size and proximity of the coil 300 to the shield 250. For example, the outer turn of the first sub-coil 310 will be closer to the shield 250 than the outer turn of the second sub-coil 320. Likewise, the inner turn of the first sub-coil 310 will be closer to the shield 250 than the inner turn of the second sub-coil 320. This slight variation in distance between the sub-coils 310, 320 to the shield 250 may cause slight variances in the electrical balance of each of the sub-coils 310, 320 in the presence of the shield 250. A symmetrical physical split of the non-planar coil 200 may therefore result in a centre-tapped coil 300 with two electrically unbalanced sub-coils 310, 320.

While operating in a vacuum, and while in the absence of a shield 250, the physical symmetrical split of the non-planar coil 200 would result in a centre-tapped coil 300 comprised of a first sub-coil 310 and a second sub-coil 320 that, theoretically, are electrically balanced. The introduction of a shield 250 or other structures in proximity to the centre-tapped coil 300 and its sub-coils 310, 320 may alter the electrical balance of a physically symmetrical split of the coil 300, resulting in two electrically unbalanced sub-coils 310, 320.

While the above discussion has been presented in reference to the coil 300, it is equally applicable to the coil 300' depicted in FIGS. 6*a* to 6*c*.

The transmit element 116 or receive element 124 may comprise the described coils 300, 300'. Further the signal received by the receive element 124 of the receiver 100 may be a differential AC signal. In many applications, the load 128 of the receiver 100 requires a direct current (DC) signal. A rectifier may be used to rectify the received AC signal to the required DC signal.

As the coils 300, 300' are centre-tapped a particular rectifier is required for rectifying the received/extracted AC power signal. In particular the coil 300, 300' behaves like an AC power source and thus, a rectifier which is compatible with an AC power source is required.

Figure 7:
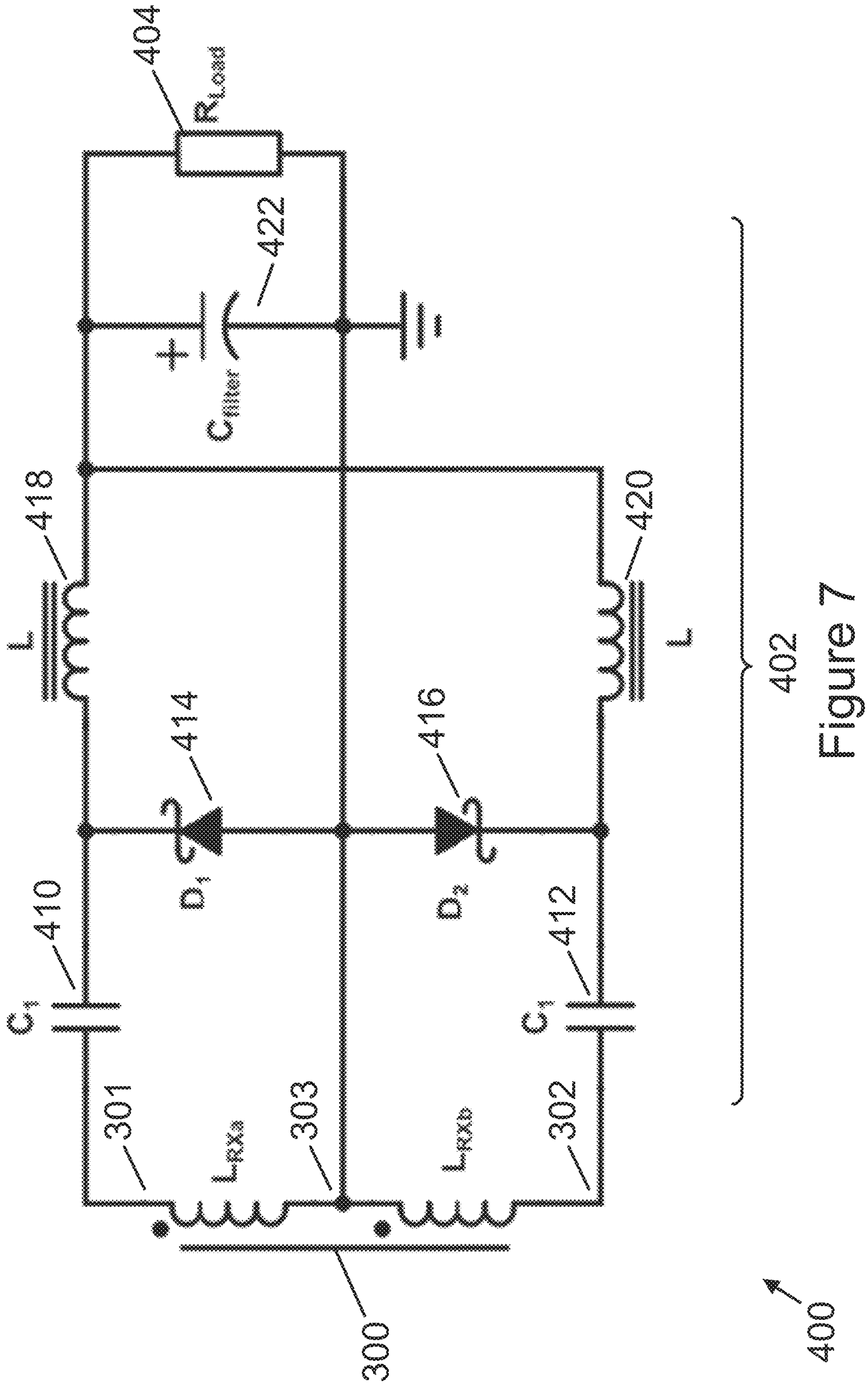
FIG. 7 is a schematic diagram of a receiver comprising a current-driven differential rectifier.

Turning now to FIG. 7, a portion of a receiver for use in a wireless power transfer system is generally identified by reference numeral 400. The receiver 400 comprises the non-planar centre-tapped coil 300 electrically connected to a current-driven differential rectifier 402. The rectifier 402 is electrically connected to a load 404.

While the receiver 400 comprises the non-planar centre-tapped coil 300, the following description is equally applicable to the described planar centre-tapped coil 300'.

As will be described the unique topology of the rectifier 402 allows for a significant reduction in the number of diodes required to operate the rectifier 400 efficiently. For example, when compared to traditional full-wave bridge rectifier designs the number of diodes required is reduced by fifty percent (50%).

The current-driven differential rectifier 402 comprises first and second capacitors 410, 412 each having a capacitance $C_1$, first and second switching elements which in the illustrated arrangement comprise first and second diodes 414, 416 ($D_1$, $D_2$), and first and second inductors 418, 420 each having an inductance L.

The first capacitor 410 and first inductor 418 are electrically connected in series. The second capacitor 412 and second inductor 420 are electrically connected in series. The first diode 414 is electrically connected between the first capacitor 410 and first inductor 418 in parallel. The second diode 416 is electrically connected between the second capacitor 412 and second inductor 420 in parallel. The first capacitor 410 is electrically connected to first terminal 301 of the coil 300. The second capacitor 412 is electrically connected to the second terminal 302 of the coil 300. The first and second diodes 414, 416 are electrically connected to the third terminal or tap 303 of the coil 300.

In the illustrated arrangement the rectifier 402 further comprises a capacitor 422 electrically connected in parallel between the first inductor 418 and load 404. The capacitor 422 is for filtering a power signal output by the rectifier 402. The capacitor 422 is optional.

The rectifier 402 is current-driven meaning the AC current supplied by the coil 300 has a constant amplitude that is independent of the load 404. In conventional wireless power transfer systems, the coil of the receiver of the system supplies a constant AC voltage. As such the rectifier 402 provides an approximately constant output DC current independent of the load 404, as opposed to conventional rectifier designs where the rectifier provides an approximately constant DC voltage independent of load.

In practice, the output DC current may vary slightly based on changes in load 404 due to non-linear effects. Therefore, values of the electrical components of the rectifier 402 as derived by the Equations may have to be adjusted based on experimentation.

In accordance with FIG. 7, the capacitance value $C_1$ of each of the capacitors 410, 412 is tuned such that the capacitors 410, 412 resonate with the total inductance $L_{RX}$ of the non-planar receiver coil 300, where $L_{RX}$ is equal to $L_{RXa}+L_{RXb}$, the inductances of the sub-coils 310, 312, respectively. The capacitance value $C_1$ is given by Equation 3 below:

$$C_1 = \frac{2}{\omega^2 L_{RX}} \qquad \text{(Equation 3)}$$

In use wireless power is extracted by the coil 300 and supplied to the rectifier 402. In particular the coil 300 supplies a constant AC current to the rectifier 402. The AC current is rectified by the rectifier 402 to supply an approximately constant output DC current to the load 404 which is filtered by the capacitor 422.

Figure 8:
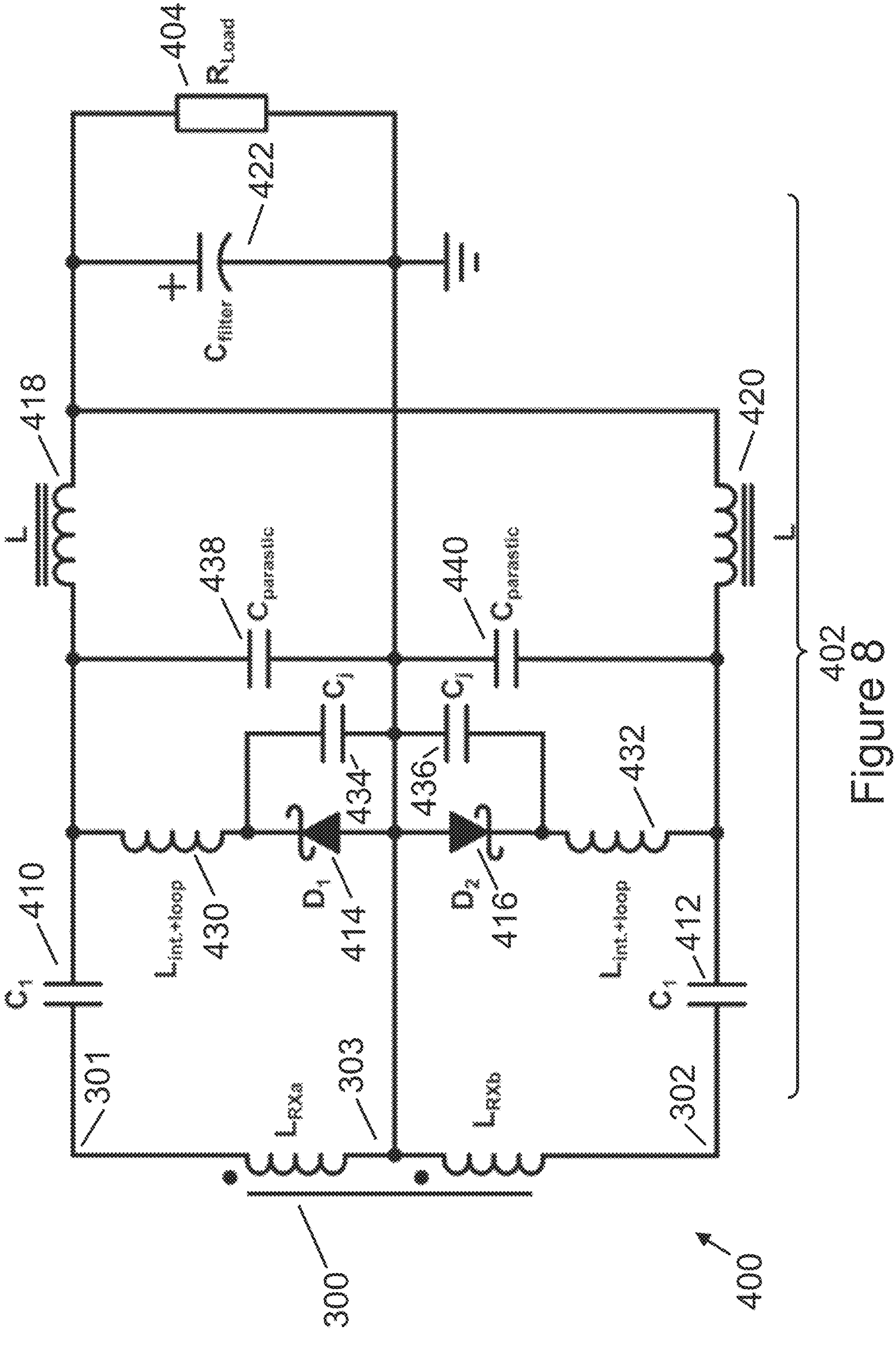
FIG. 8 is a more detailed schematic diagram of the receiver of FIG. 7.

As previously stated, the rectifier 402 is current-driven. FIG. 8 illustrates a more detailed schematic of the receiver 400. FIG. 8 includes additional inductors 430, 432 representative of the internal inductances of the diodes 414, 416 due to bond wires of the diodes 414, 416 having an inductance of $L_{int}$, and a loop inductance having a value of $L_{loop}$. FIG. 8 further includes capacitors 434, 436 representative of the diodes internal junction capacitance having a capacitance of $C_j$. Additionally FIG. 8 includes capacitors 438, 440 representative of an external parasitic capacitance due to the circuit board on which the rectifier 404 is formed. The capacitors 438, 440 have a capacitance of $C_{parasitic}$.

In the current-driven differential rectifier 402 the internal inductors 430, 432 and parasitic capacitors 438, 440 form an impedance network and therefore may result in voltage ringing and oscillation when driven by a constant current (from the coil 300). In particular, due to the internal inductance of each diode 414, 416, the diode's respective junction capacitance (given by the value $C_j$), and the external parasitic capacitance (given by the value $C_{parasitic}$) significant voltage ringing may occur across the diodes 414, 416 when the diodes 414, 416 transition from ON state to OFF state.

Voltage ringing is an undesired side-effect of the rectifier 402 as ringing and oscillations may cause the voltage to exceed the maximum voltage ratings of the diodes 414, 416. Additionally ringing and oscillations may also cause a significant increase in electromagnetic interference (EMI). Voltage ringing may be a less significant issue in conventional voltage-driven rectifiers since the current is a function of the voltage, and no current is forced into the internal and parasitic network of the respective diode in a voltage-driven rectifier.

To illustrate voltage ringing and oscillations, and other features of the receiver 400 an experimental wireless power transfer system was tested comprising the described receiver 400.

In the experimental setup the non-planar coil 300 comprises four turns, two large outer turns with dimensions 80×60 mm, and two inner turns with dimensions 68.6 mm×48.6 mm. The distance between each turn is 4 mm in the x and y directions, and 3 mm in the z direction. The non-planar coil 300 has a total inductance value $L_{RX}$ of 861 nH at 6.78 MHz. The inductance of each sub-coil 310, 320 $L_{RXA}$ and $L_{RKB}$ is 298 nH at 6.78 MHz. The tuning capacitance at 6.78 MHz is 2170 pF with a tuning capacitor Q-factor of 1000. Therefore, the mutual inductance can be calculated to be 132.5 nH at 6.78 MHz as per the previously described Equations.

On the receiver 400, the receiver coil is centre tapped with the tap moved 3 mm to the right to make the two receiver sub-coils electrically balanced (having the same inductance) in the presence of the shield 250.

In the experimental setup the shield 250 was spaced 3 mm away from the coil 300.

On the transmit side, the transmitter comprises a similar transmit coil and shield with the same values unless otherwise stated. The inductance of the transmitter coil with the shield is 900 nH, and its tuning capacitance at 6.78 MHZ is 2170 pF, with a tuning capacitor Q-factor of 1000. The transmitter resonator Q-factor is 132 and the transmitter self-resonance is 108 MHz.

Figure 9:
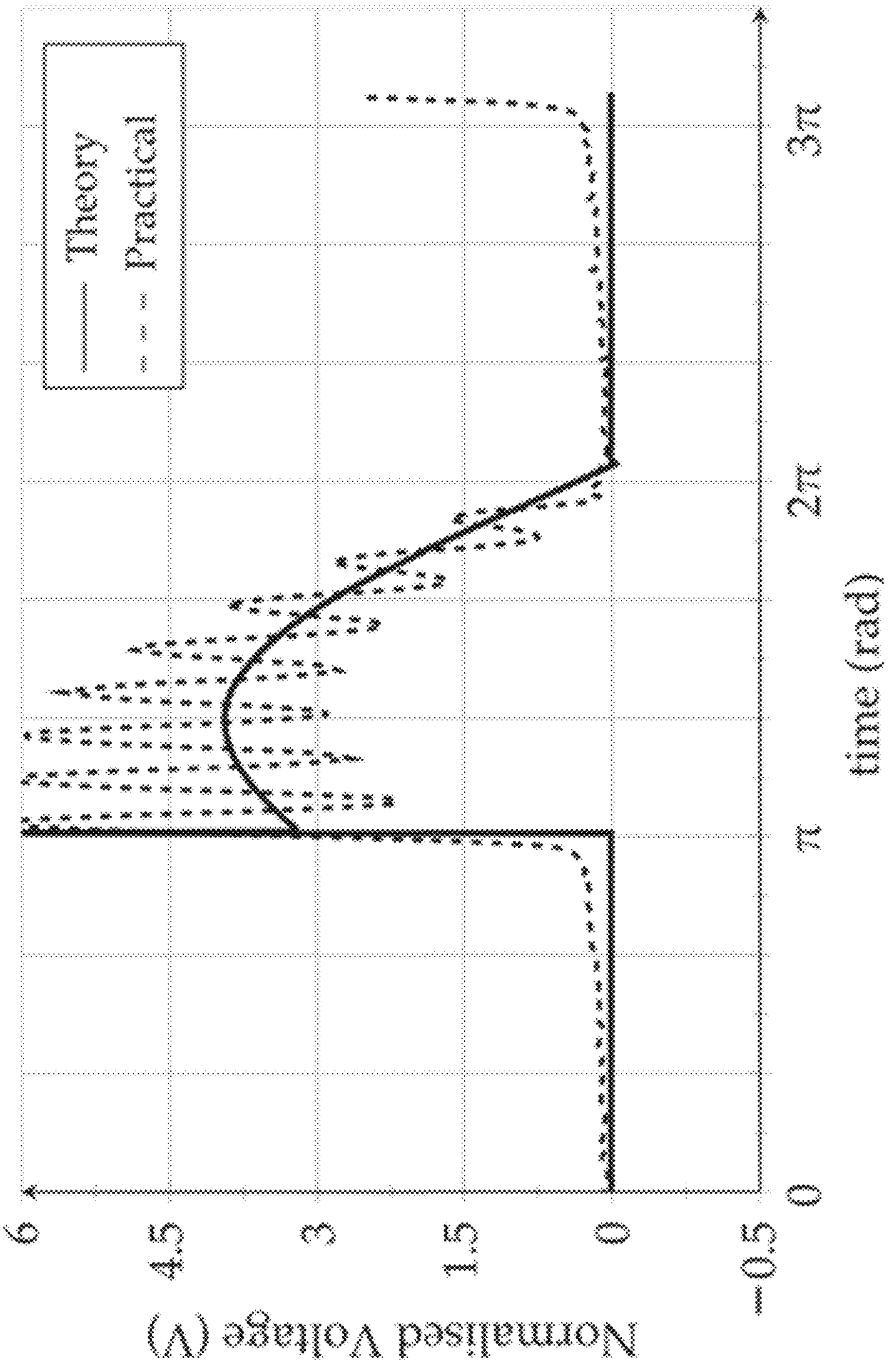
FIG. 9 is a graph of normalized voltage versus time in radians across one of the diodes of the rectifier of the receiver of FIG. 7.

Using the described experimental setup the voltage ringing, which occurs across the diodes 414, 416 during the transition from ON state to OFF state in the current-driven rectifier 402 is shown in FIG. 9 for only one of the diodes 414, 416. In particular FIG. 9 illustrates normalized voltage versus time (in radians) across one of the diodes 414, 416 of the rectifier 402.

The theoretical voltage waveform across a single diode 414 is illustrated with a solid line, and the practical voltage waveform across diode 414 is illustrated with a dashed line. As shown in FIG. 9 the practical voltage waveform exhibits undesirable voltage ringing beyond the value of the theoretical voltage waveform.

Figure 10:
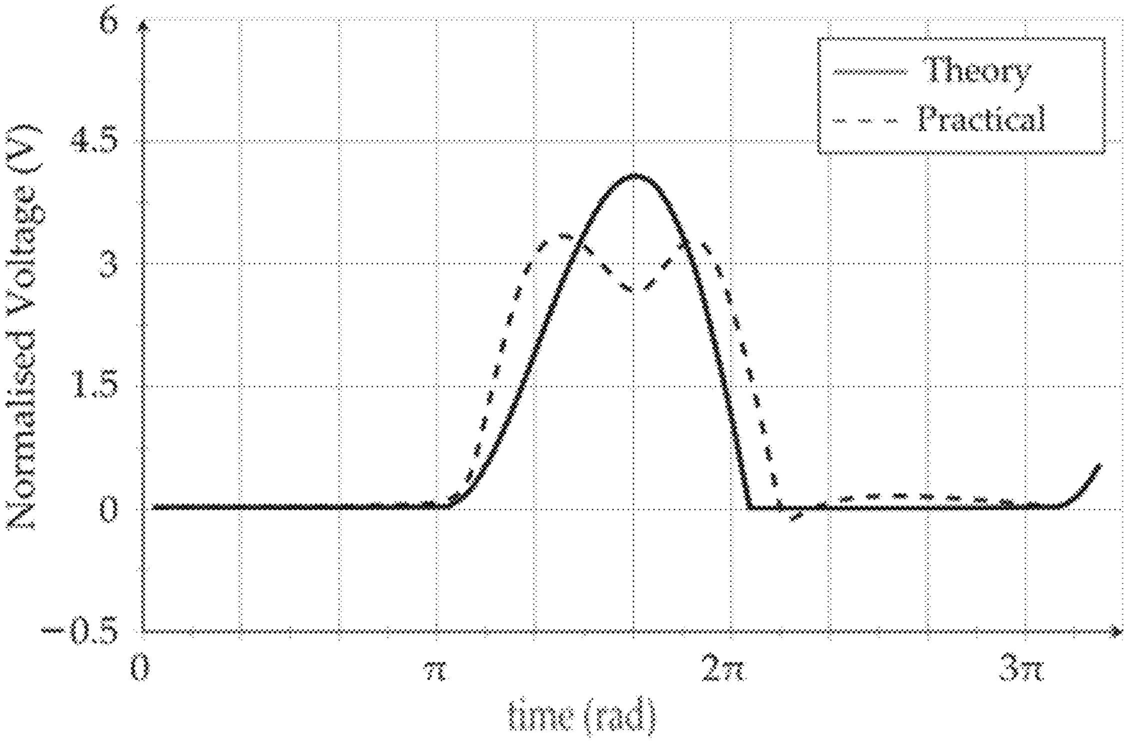
FIG. 10 is another graph of normalized voltage versus time in radians across one of the diodes of the rectifier of the receiver of FIG. 7.
Figure 11:
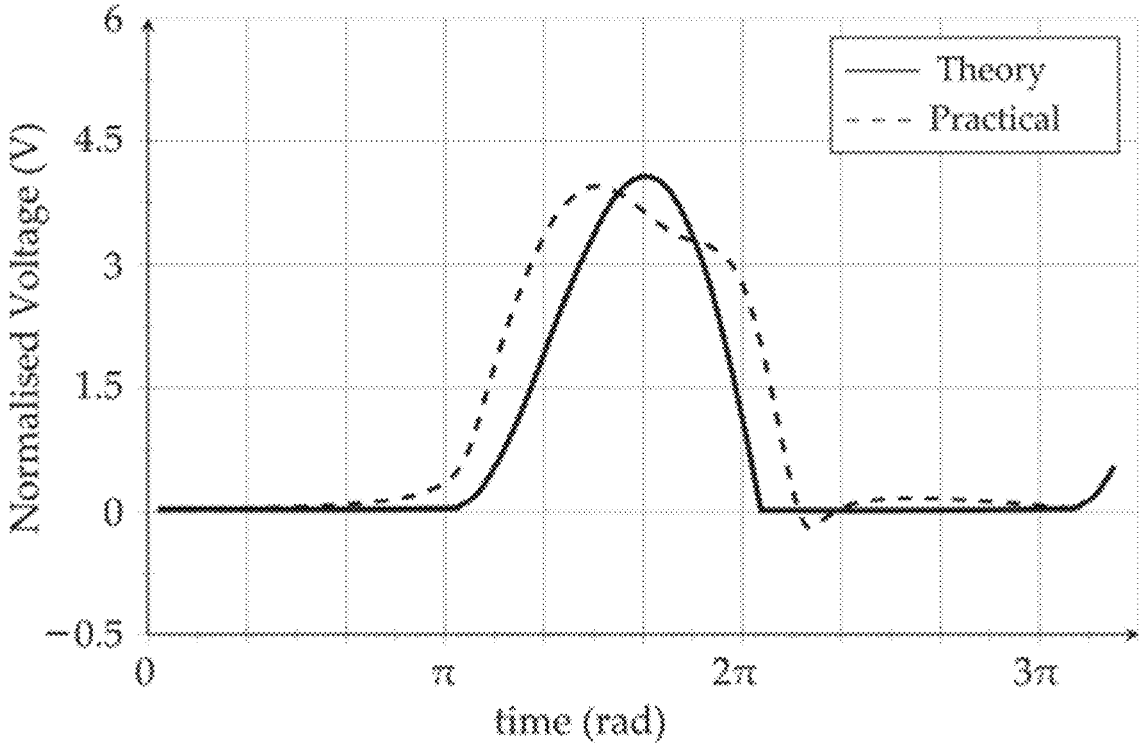
FIG. 11 is another graph of normalized voltage versus time in radians across one of the diodes of the rectifier of the receiver of FIG. 7.

Another effect of the parasitic capacitors 438, 440, internal and loop inductance (inductors 430, 432), and non-linear junction capacitance (capacitors 434, 436) of the diodes 414, 416 is distortion of the voltage waveform across the diodes 414, 416 when they are in the OFF state. This distortion may include additional $2^{nd}$ and/or $3^{rd}$ order harmonics. FIGS. 10 and 11 illustrate two examples of distorted waveforms.

It should be noted that the larger the non-linear junction capacitance Cj of the diode 414, 416, the larger the distortion.

As a consequence of the described ringing and/or distortion, the rectifier 402 may not be able to generate the required output current. In other words, the output current may be larger or smaller than what is required by the load 404.

Figure 12:
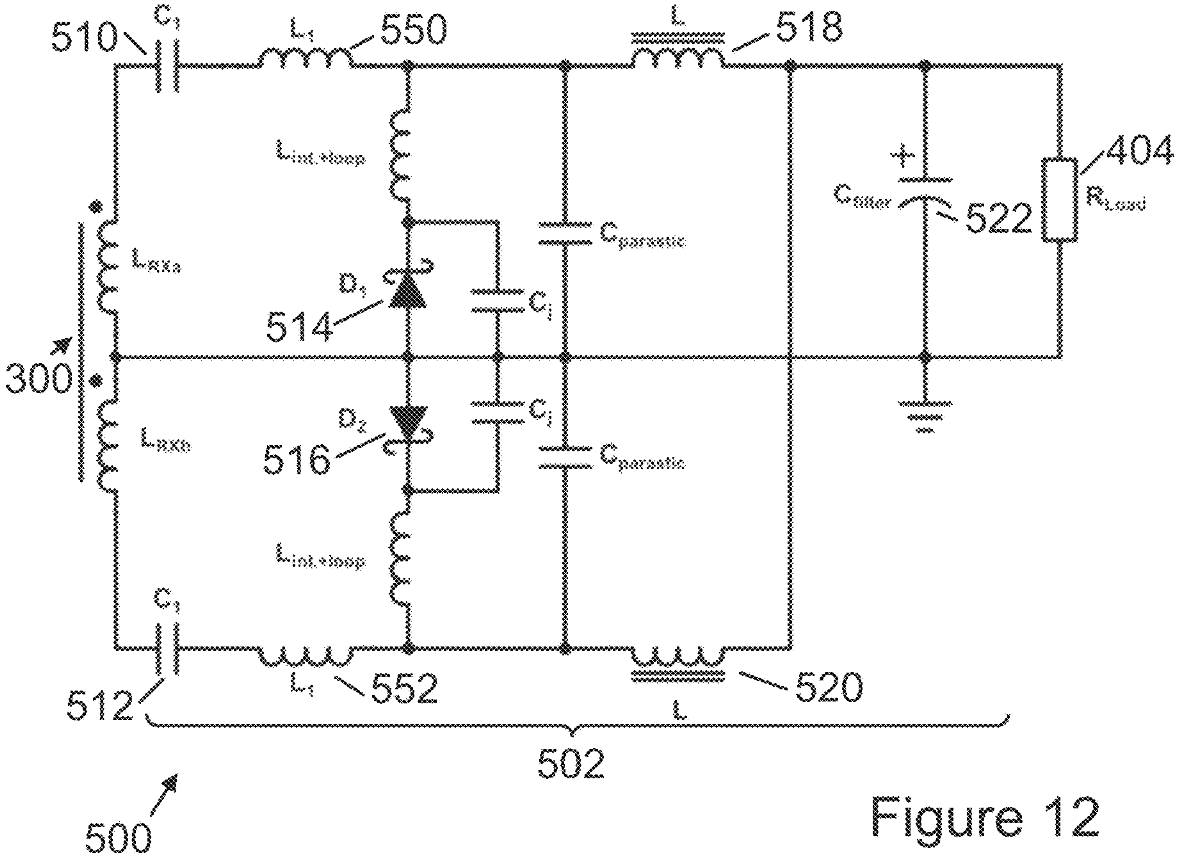
FIG. 12 is a schematic diagram of a receiver comprising another embodiment of a current-driven differential rectifier.

To minimise the distortion and to reduce its impact on the rectifier's performance, additional inductors may be included on each of the output terminals (terminals 301, 302) of the coil 300. This embodiment is illustrated in FIG. 12. In the illustrated arrangement receiver 500 comprises the coil 300, rectifier 502 and load 404. The rectifier 502 comprises the same elements as rectifier 402 with like features having reference numerals incremented by 100. The rectifier 502 comprises additional inductors connected to the terminals 301, 302 of the coil 300. In particular, the rectifier 502 comprises a third inductor 550 electrically connected to the first terminal 301 via the first capacitor 510. The third inductor 550 is electrically connected to the first capacitor 510 in series, and electrically connected to the first inductor 518 in series. The first diode 514 is electrically connected to the first and third inductors 518, 550 in parallel.

The rectifier 502 further comprises a fourth inductor 552 electrically connected to the first terminal 302 via the second capacitor 512. The fourth inductor 552 is electrically connected to the second capacitor 512 in series, and electrically connected to the second inductor 520 in series. The second diode 516 is electrically connected to the second and fourth 520, 552 in parallel.

The third and fourth inductors 550, 552 have an inductance of $L_1$. The third and fourth inductors 550, 552 introduce inductive impedance which negates part of the capacitive impedance of the diodes' 514, 516 non-linear junction capacitance, i.e. $C_j$. The inductance $L_1$ of these two additional inductors 550, 552 depends on the value of the diodes' 514, 516 junction capacitance $C_j$. In this embodiment, the inductance $L_1$ of the inductors 550, 552 may be up to 100 nH.

Figure 13:
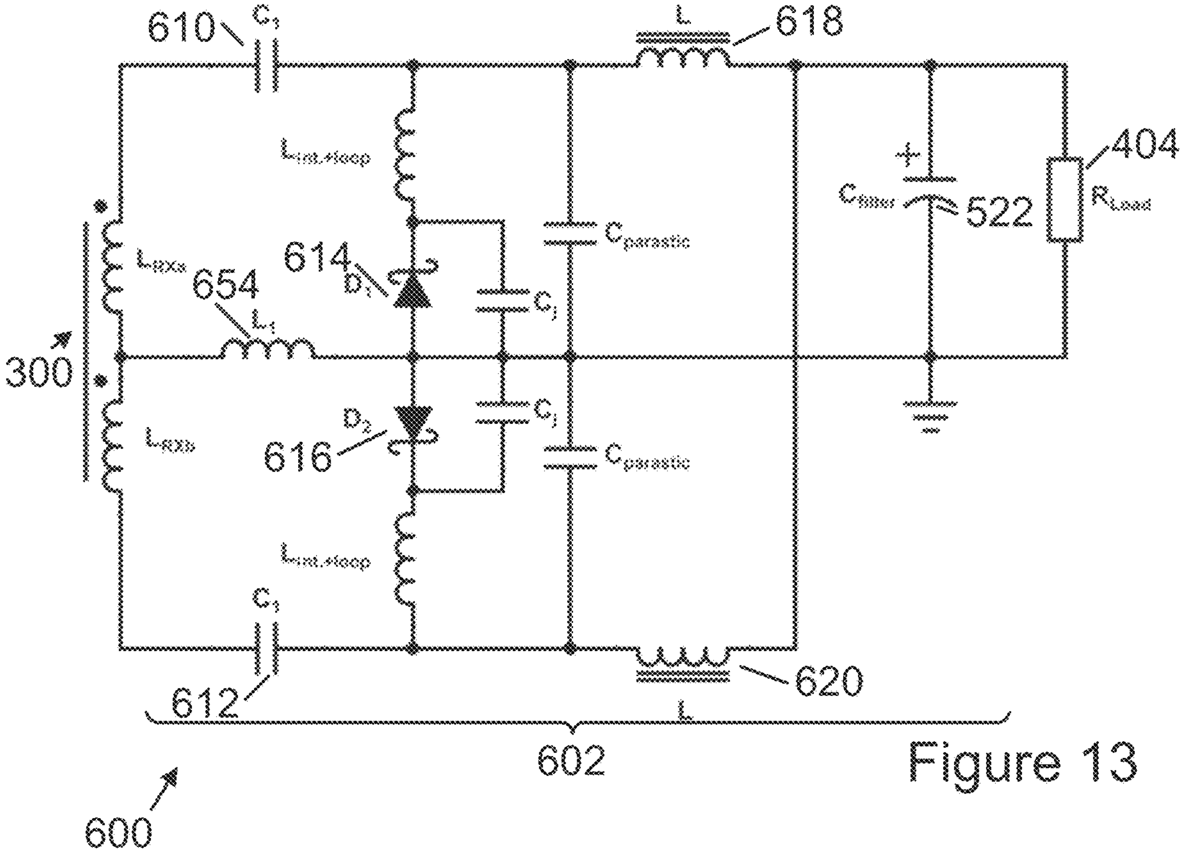
FIG. 13 is a schematic diagram of a receiver comprising another embodiment of a current-driven differential rectifier.

The third and fourth inductors 550, 552 may introduce power losses and consequently reduce the efficiency of the differential rectifier 502. Accordingly, the inductors 550, 552 may be removed and a single additional inductor electrically connected to the third terminal or tap of the coil. Such an arrangement is illustrated in FIG. 13. In the illustrated arrangement a receiver 600 comprises the coil 300, rectifier 602 and load 404. The rectifier 602 comprises the same elements as rectifier 402 with like features having reference numerals incremented by 200. The rectifier 602 comprises an additional inductor connected to the third terminal or tap 303 of the coil 300. In particular, the rectifier 602 comprises a third inductor 654 electrically connected to the third terminal or tap 303. The third inductor 654 is electrically connected to the first and second diodes 614, 616.

The third inductor 654 may still introduce a power loss to the differential rectifier 602; however, the power loss will be lower compared to power losses introduced by the third and fourth inductors 550, 552 to the differential rectifier 502.

The third inductor 654 has an inductance $L_1$, which is dependent on the junction capacitances $C_j$ of the diodes 614, 616. In this embodiment, the inductance $L_1$ of the inductor 654 may be up to 100 nH.

Further to minimize the described voltage ringing the current-driven differential rectifier may further comprise a capacitor electrically connected to one of the first and second switching elements in parallel. The capacitor may dampen or reduce voltage ringing at the rectifier. Voltage ringing may negatively impact power transfer as the load does not receive a stable power signal. Accordingly, reducing, or dampening voltage ringing may improve power signal stability received at the load.

Figure 14:
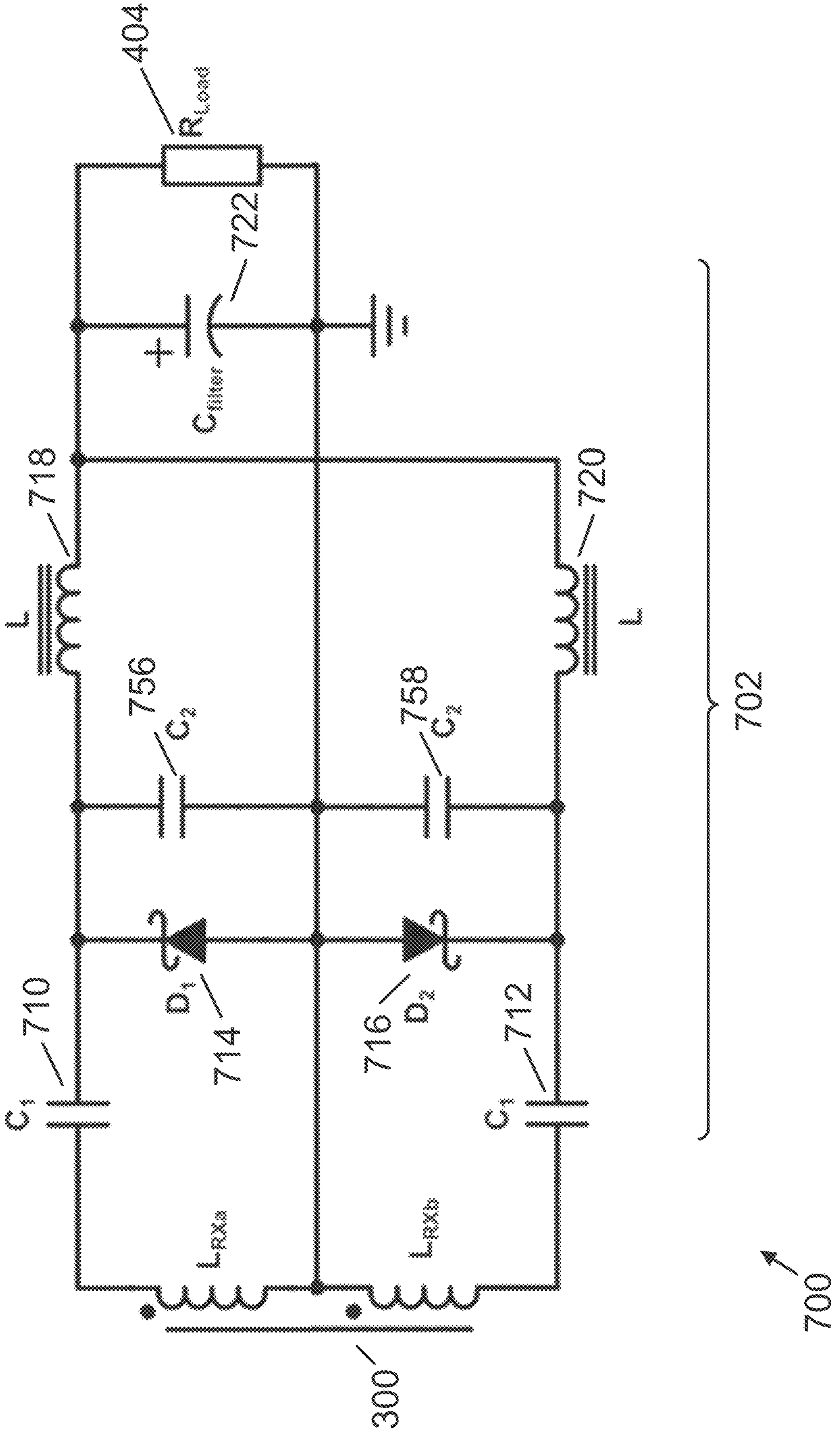
FIG. 14 is a schematic diagram of a receiver comprising another embodiment of a current-driven differential rectifier.

The additional capacitor is illustrated in FIG. 14, which depicts another arrangement of a receiver generally identified by reference numeral 700. The rectifier 702 comprises the same elements as rectifier 402, unless otherwise stated, with like features having reference numerals incremented by 300. In the illustrated arrangement the rectifier 702 comprises a third capacitor 756, which is electrically connected to the first diode 714 in parallel, and a fourth capacitor 758, which is electrically connected to the second diode 716 in parallel. The third and fourth capacitors 756, 758 have capacitance $C_2$.

The capacitance $C_2$ of the capacitors 756, 758 depends on frequency of operation and operational voltages and currents. In contrast with a Class E rectifier, there is no specific equation readily available to determine the capacitance $C_2$. However, as a general rule, based on simulation and experimental tests, it may be assumed that the capacitance $C_2$ is given by Equation 4 below:

$$C_2 = \frac{0.175}{\omega R_{LOAD}} \quad \text{(Equation 4)}$$

The added third and fourth capacitors 756, 758 dampen the ringing across the diodes 714, 716 such that the diodes 714, 716 conduct the bulk of the current during the transition from ON state to OFF state. The internal and parasitic inductors, and capacitors having values $L_{int.+loop}$, $C_j$ and $C_{parasitic}$, respectively, have been reduced to a negligible value with the addition of the capacitors 756, 758.

Figure 15:
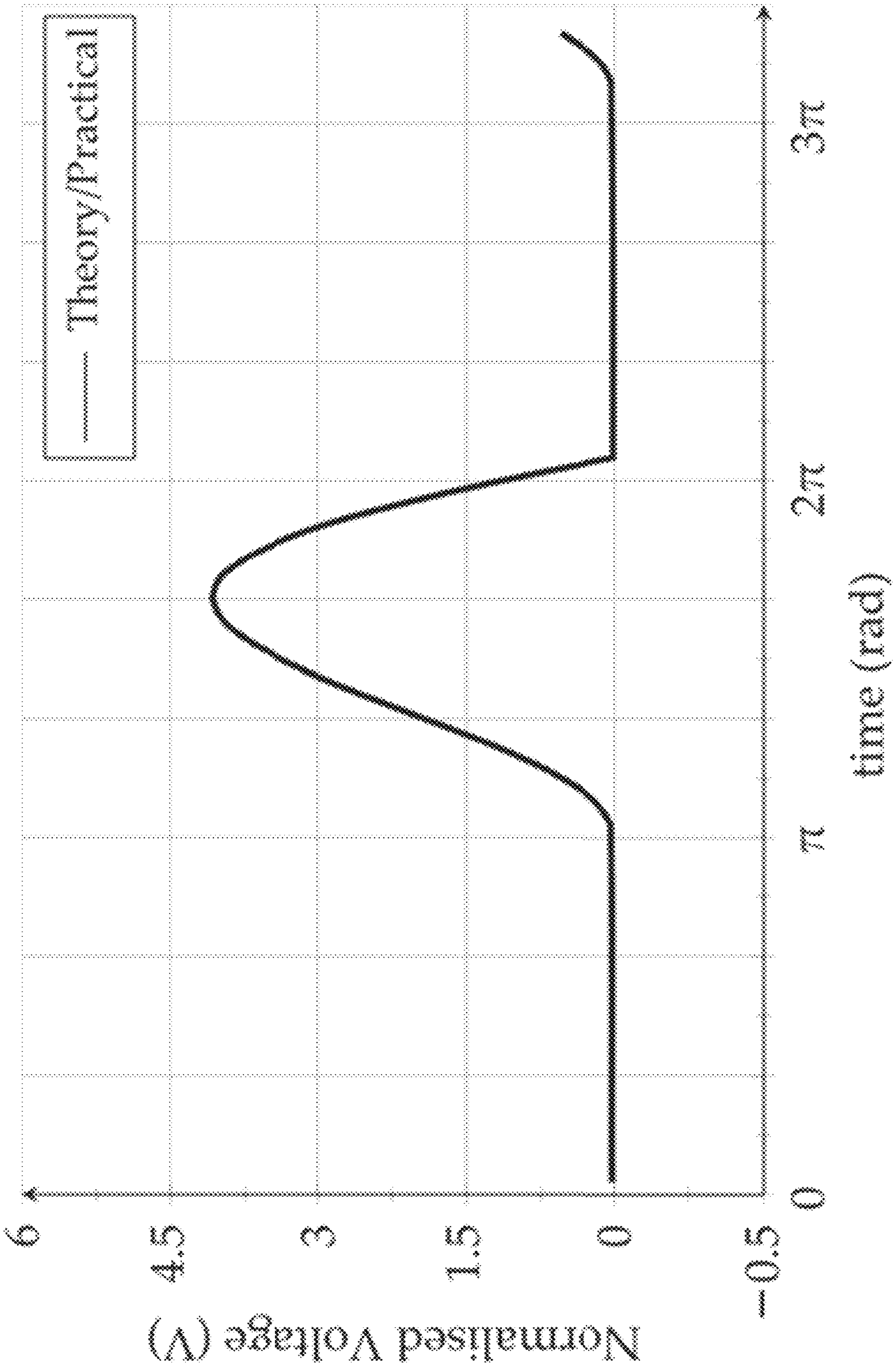
FIG. 15 is a graph of normalized voltage versus time in radians across one of the diodes of the rectifier of the receiver of FIG. 14.

Using the previously-described experimental setup the reduction in voltage ringing, which occurs across the diodes 714, 716 during the transition from ON state to OFF state in the current-driven rectifier 702, is shown in FIG. 15 for only one of the diodes 714, 716. In particular FIG. 15 illustrates normalized voltage versus time (in radians) across one of the diodes 714, 716 of the rectifier 702. As illustrated in FIG. 15, the theoretical voltage waveform is aligned with the practical voltage waveform across diode 714. No voltage ringing is observed. The resulting waveform is very similar to the waveform seen in Class E rectifiers.

The described current-driven differential rectifier is a passive rectifier. That is to say, the rectifier is a diode-only rectifier. Passive rectifiers when operated at low output voltages or high output currents may have a reduced efficiency because of the power loss associated with the forward voltage drop of the diodes. This may limit the use of such a passive rectifier in applications which require fast charging rates.

The rectifier may be operated as a synchronous rectifier by replacing the diodes with FETs. Such a synchronous rectifier may have a higher efficiency than the described passive rectifiers, especially at low output voltages or high output currents. The synchronous rectifier may also have a better performance over the entire load range since the duty cycle of the FETs is always controlled and can be maintained at 50%. This is not the case with a passive rectifier where the duty cycle of the diodes is impacted by the load and therefore may result in detuning of the entire wireless power transfer system, i.e. the transmitter and receiver.

Figure 16:
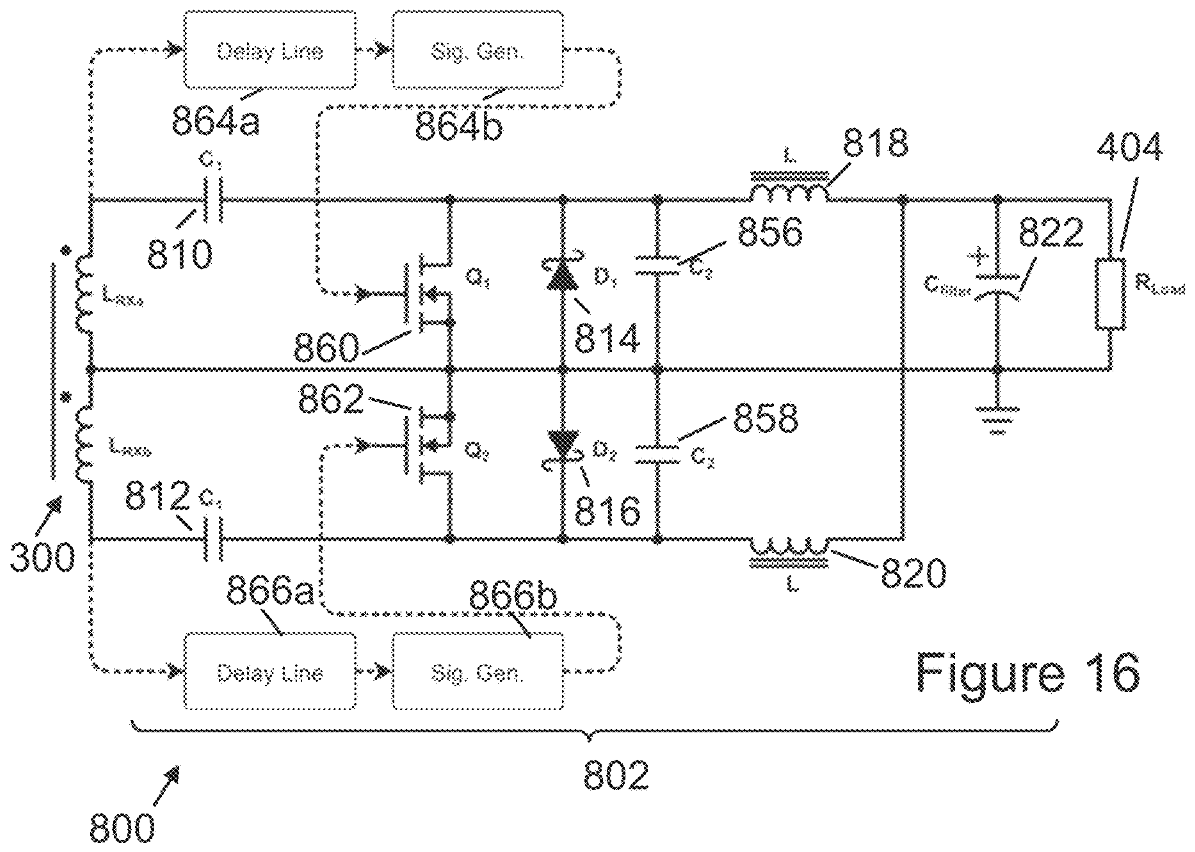
FIG. 16 is a schematic diagram of a receiver comprising another embodiment of a current-driven differential rectifier.

Turning now to FIG. 16, another arrangement of a receiver generally identified by reference numeral 800 is shown. The receiver 800 comprises the coil 300, rectifier 802 and the load 404. The rectifier 802 comprises the same elements as rectifier 702, unless otherwise stated, with like features having reference numerals incremented by 100. In the illustrated arrangement the rectifier 802 additionally comprises first and second FETs 860, 862. The first FET 860 is electrically connected to the first terminal 301 of the coil 300 via the first capacitor 810, and the third terminal or tap 303. The second FET 862 is electrically connected to the second terminal 302 of the coil 300 via the second capacitor 812, and the third terminal or tap 303. The first diode 814 is electrically connected to the first FET 860 and the third capacitor 856 in parallel. The second diode 816 is electrically connected to the second FET 862 and the fourth capacitor 858 in parallel.

The rectifier 802 further comprises a first delay line 864*a*, a first signal generator 864*b*, a second delay line 866*a* and a second signal generator 866*b*. The first delay line 864*a* is electrically connected to the first terminal 301 of the coil 300 and the first signal generator 864*b*. The first signal generator 864*b* is electrically connected to the first delay line 864*a* and the first FET 860. The first delay line 864*a* is for synchronizing operation of the first FET 860. The first signal generator 864*b* is for generating a pulse signal to drive the first FET 860.

The second delay line 866*a* is electrically connected to the second terminal 302 of the coil 300 and the second signal generator 866*b*. The second signal generator 866*b* is electrically connected to the second delay line 866*a* and the second FET 862. The second delay line 866*a* is for synchronizing operation of the second FET 862. The second signal generator 866*b* is for generating a pulse signal to drive the second FET 862.

The switching signals for the FETs 860, 862 are self-generated. The voltage across each of the centre-tapped sub-coil 310, 320 is sensed and connected to the respective first and second delay lines 864*a*, 866*a* and then into the respective first and second signal generators 864*b*, 866*b* which generate a pulse square wave to drive the respective first and second FETs 860, 862. Each delay line 864*a*, 866*a* is designed such that each signal generator 864*b*, 866*b* is triggered at the right time and the FETs 860, 862 switch on when the drain voltage across the FETs 860, 862 reaches zero. Further details of synchronous rectification may be found in Applicant's own U.S. patent application Ser. No. 17/472,002, the relevant portions of which are incorporated herein by reference.

Figure 17:
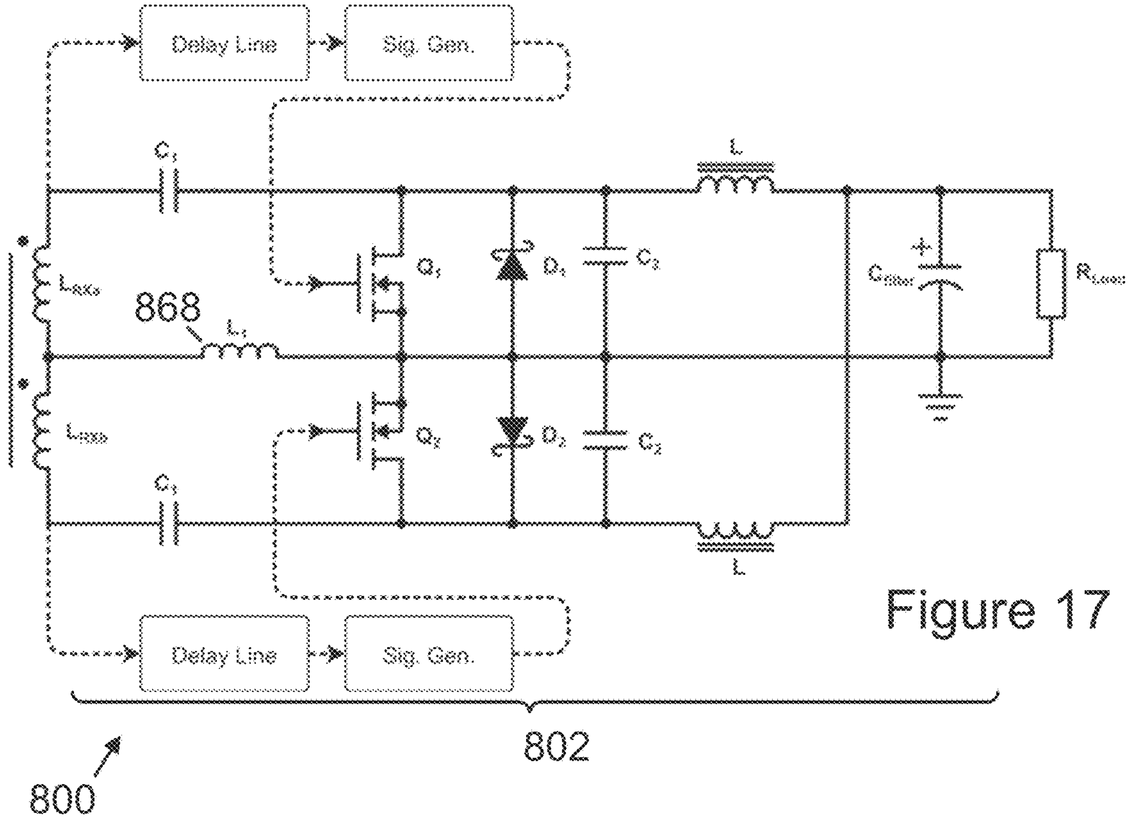
FIG. 17 is a schematic diagram of a receiver comprising another embodiment of a current-driven differential rectifier.

Turning now to FIG. 17 another arrangement of the synchronous rectifier is illustrated. In this arrangement the rectifier 802 further comprises an additional inductor electrically connected to third terminal or tap 303 of the coil to reduce distortion as previously described. In particular, in the illustrated arrangement, the rectifier 802 further comprises a third inductor 868 electrically connected to the tap 303 and the FETs 860, 862. The third inductor 868 has an inductance $L_1$. The third inductor 868 is for reducing distortion across the voltage to the FETs 860, 862 due to the FETs 860, 862 non-linear output capacitances.

Figure 18:
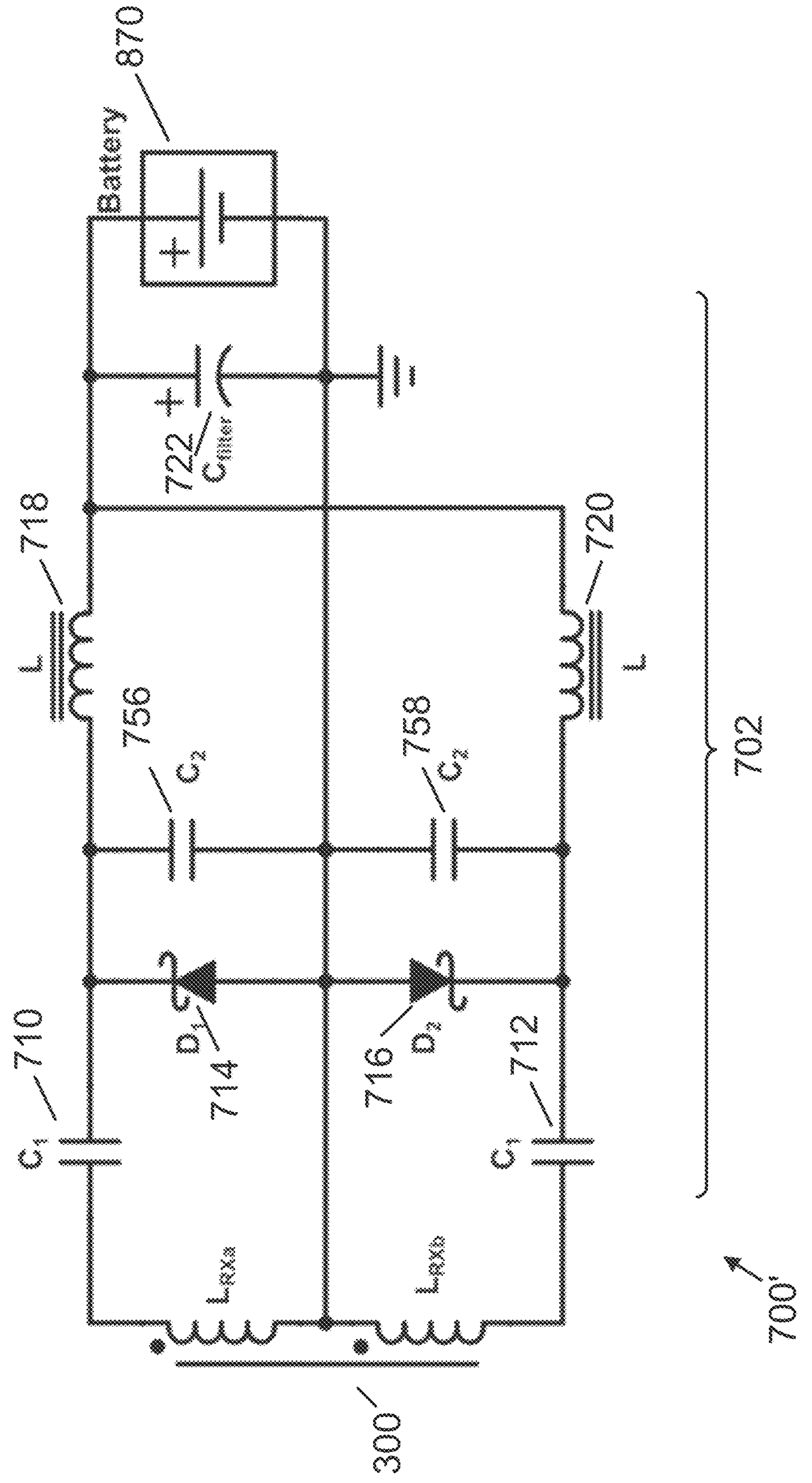
FIG. 18 is a schematic diagram of a receiver comprising the current-driven differential rectifier of FIG. 14 connected to a battery.

As previously stated, the above described current-driven differential rectifiers output a constant DC signal. As such the rectifiers are suitable for charging cells or batteries without the need for an intermediate DC/DC converter. An example of such an arrangement is illustrated in FIG. 18. In this arrangement, a receiver 700' comprises the coil 300, the rectifier 700 (described with reference to FIG. 14) and a battery 880. The battery 880 is electrically connected to the output of the rectifier 700 directly. That is to say, the battery is directly connected to the rectifier 700 without a DC/DC converter.

While particular coils 300, 300' have been described, one of skill in the art will appreciate that variations are possible. In particular, another coil may be used to address one or more of the issues discussed with reference to the described inverter.

For example, FIG. 10 illustrates a distorted waveform. Such distortion may be caused by the parasitic capacitors 438, 440, internal and loop inductance (inductors 430, 432) and non-linear junction capacitance (capacitors 434, 436) of the diodes 414, 416 which may distort the voltage waveform across the diodes 414, 416 when they are in the OFF state. This distortion may include additional $2^{nd}$ and/or $3^{rd}$ order harmonics.

The distortion illustrated in the practical normalized voltage waveform of FIG. 10 may be referred to as a "double-hump" in contrast with the desired theoretical "single-hump" waveform. As described and illustrated in FIGS. 12 and 13, additional inductors may be added to address this distortion. For example, additional inductors 550, 552 (FIG. 12) may be added at the output of the first and second terminals 301, 302 of the coil 300, or an additional inductor 654 (FIG. 13) may be added at the output of the third terminal or tap 303 of the coil 300. Such additional inductor(s) may have the effect of cancelling part of the capacitive mutual reactance such that $2^{nd}$ order harmonic distortion in the didoes is reduced. This may eliminate the "double-hump" distortion illustrated in FIG. 10.

However, such additional inductors may increase the size of the differential rectifier described. This may be problematic in space-constrained applications, e.g., mobile devices. Accordingly, an alternative solution may be desired for particular applications.

Figure 19:
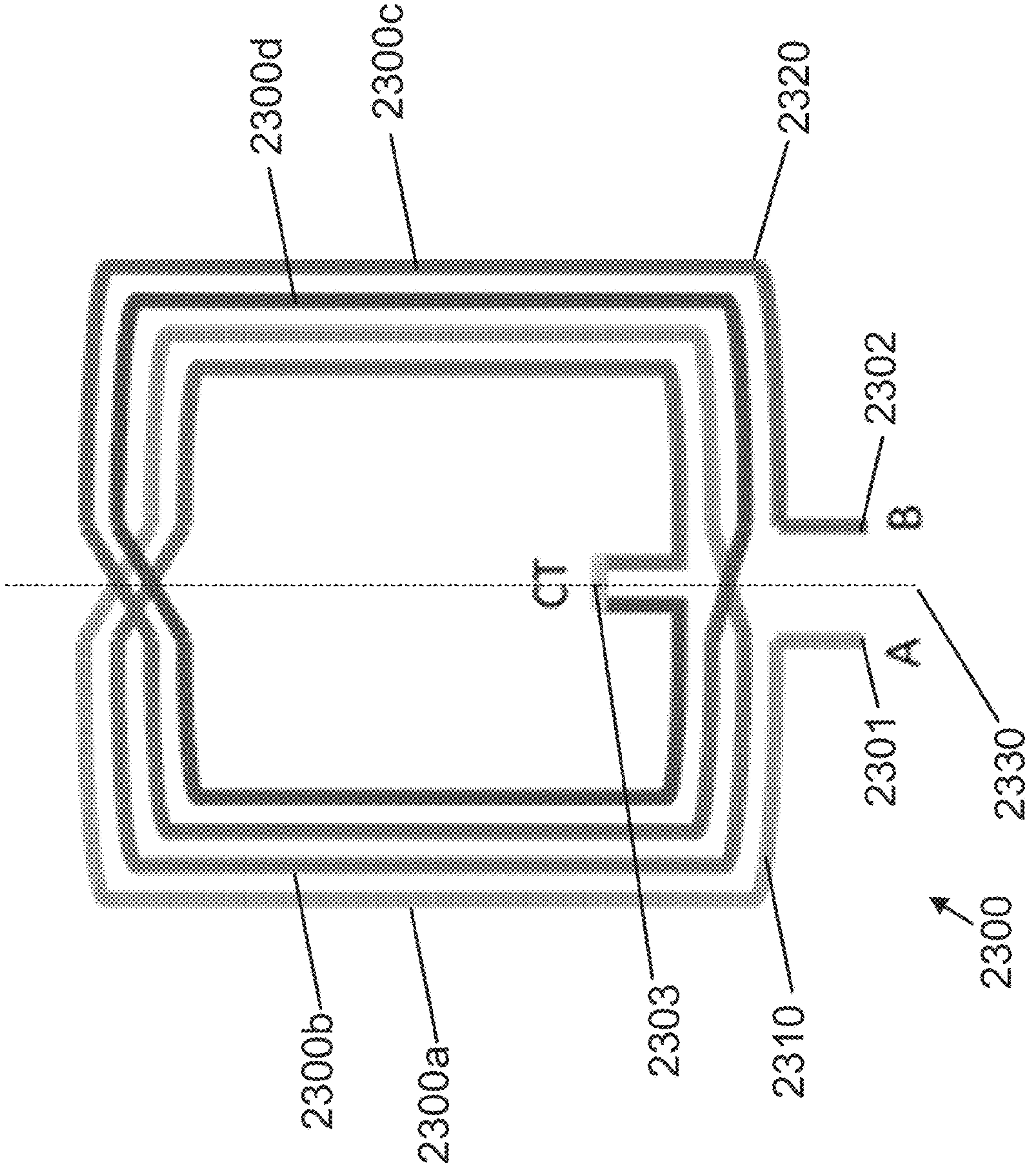
FIG. 19 is a plan view of another embodiment of a coil for use in a wireless power transfer system.
Figure 20:
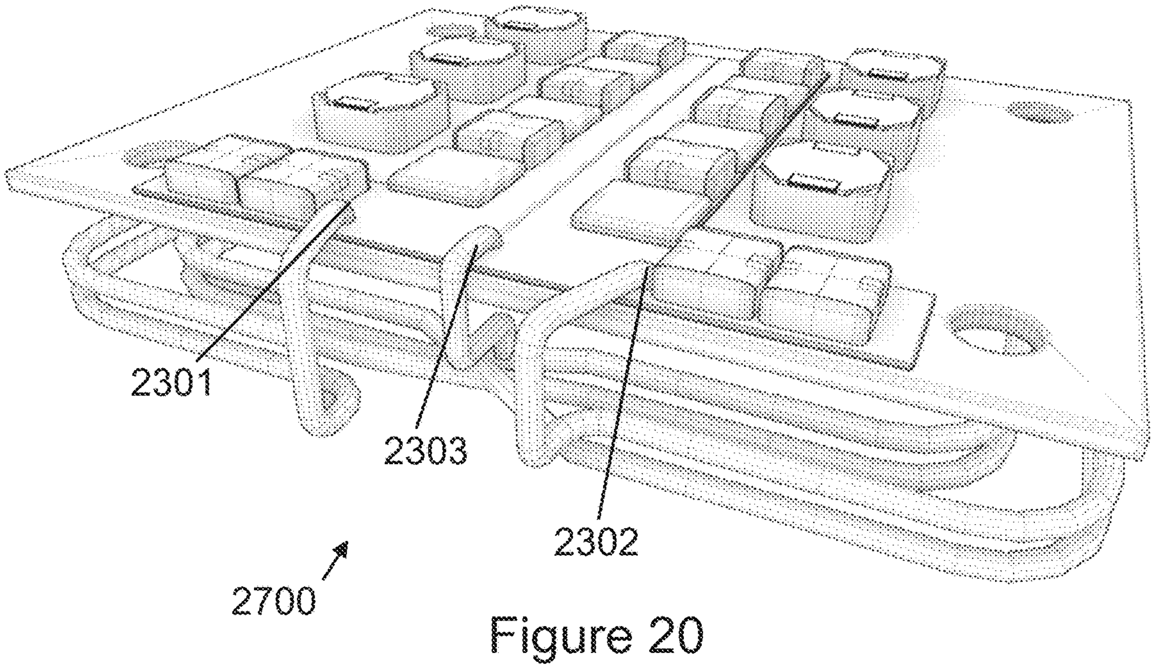
FIG. 20 is a top perspective view of a receiver for use in a wireless power transfer system.
Figure 21:
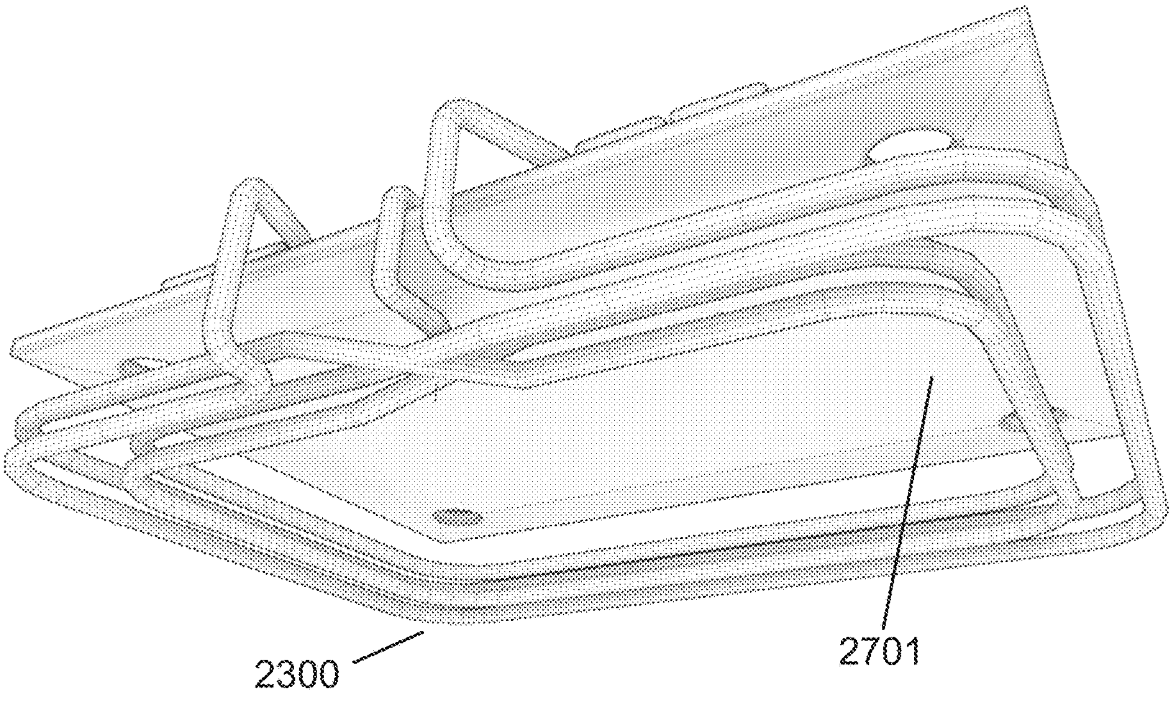
FIG. 21 is a bottom perspective view of the receiver of FIG. 20.
Figure 22:
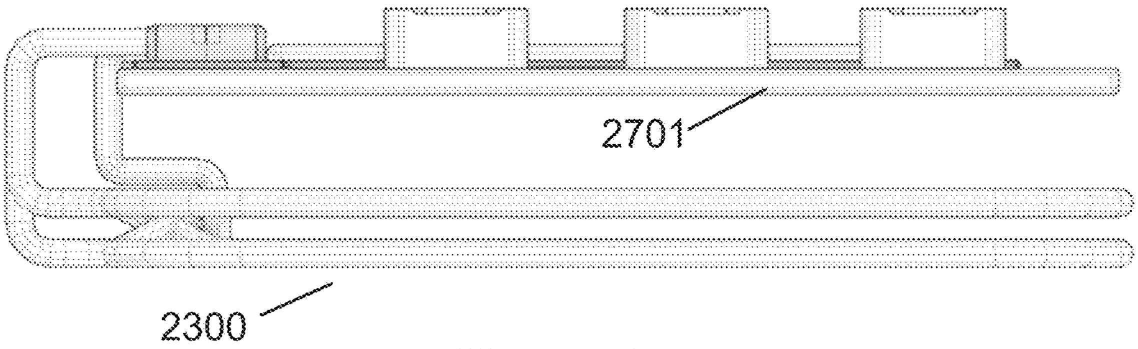
FIG. 22 is a side elevational view of the receiver of FIG. 20.
Figure 23:
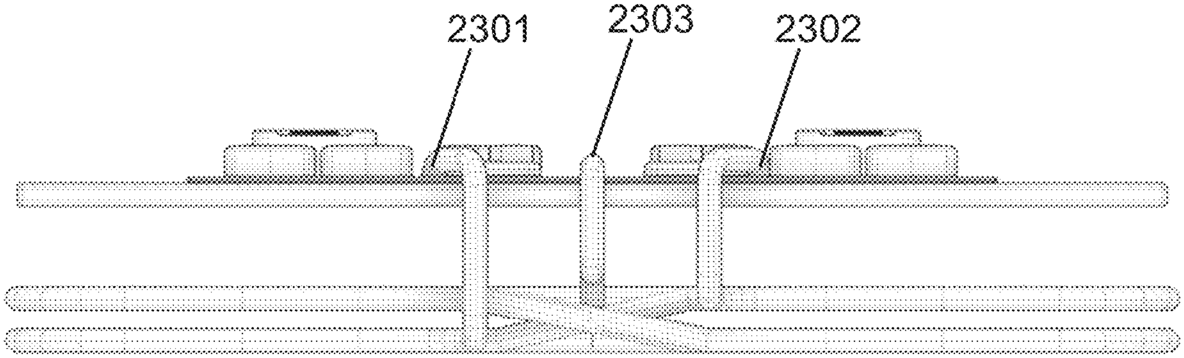
FIG. 23 is a front elevational view of the receiver of FIG. 20.

Turning now to FIG. 19 another embodiment of a coil 2300 is illustrated. Similar to coil 300, the coil 2300 has a first terminal 2301 and a second terminal 2302. The coil 2300 also has a third terminal or tap 2303 intermediate the first and second terminals 2301, 2302, respectively. The coil 2300 comprises two windings. In the illustrated arrangement, the coil 300' comprises four turns equally spaced by air-gaps between the turns, with the first terminal 2301 at one end of the coil 2300, and the second terminal 2302 at the opposite end of the coil 2300. Each winding has two turns.

The first terminal 2301 is located at a termination of the outer turn of the first winding, and the second terminal 2302 is located at a termination of the outer turn of the second winding. The tap 2303 is located between the first and second terminals 2301, 2302. While not illustrated, in use, the tap 2303 is electrically connected to ground.

The tap 2303 equally splits the coil 2300 into two equally balanced sub-coils 2310, 2320. The sub-coils 2310, 2320 are electrically coupled to each other at the tap 2303 and are electrically balanced. As illustrated in FIG. 19, the tap 2303 splits the coil 2300 along line 2330. Line 2330 defines a central axis of the coil 2300 about which the windings are mirrored.

In the illustrated arrangement a first turn 2300*a* is the outermost turn of the first sub-coil 2310. The first turn 2300*a* is electrically connected or integral with a second turn 2300*b*, which is enclosed by the first turn 2300*a*. In this context, enclosed refers to the first turn 2300*a* at least partially encircling the second turn 2300*b* in the same x-y plane.

A third turn 2300*c* is the outermost turn of the second sub-coil 2320. The third turn 2300*c* is electrically connected or integral with a fourth turn 2300*d*, which is enclosed by the third turn 2300*c*. In this context, enclosed refers to the third turn 2300*c* at least partially encircling the fourth turn 2300*d* in the same x-y plane. The second and fourth turns 2300*b*, 2300*d* are connected at the third terminal or tap 2303.

The first turn 2300*a* crosses over or under the third turn 2300*c* and fourth turn 2300*d* at a midpoint thereof. The second turn 2300*b* crosses over or under the third turn 2300*c* and fourth turn 2300*d* at a midpoint thereof. The third turn 2300*c* crosses over or under the firsts turn 2300*a* and second turn 2300*b* at a midpoint thereof. The fourth turn 2300*d* crosses over or under the firsts turn 2300*a* and second turn 2300*b* at a midpoint thereof. The second and third turns 2300*b*, 2300*c* cross over or under each other at end points thereof, or the first and fourth turns 2300*a*, 2300*b* cross over or under each other at end points thereof.

While crossing over or under of the turns is described and illustrated in FIG. 19, the turns are generally in the same x-y plane.

The illustrated coil 2300 exhibited a reduced mutual coupling k compared with the previously described coils 300, 300'. However, the described and illustrated winding pattern minimizes the overlap of turns between the sub-coils 2310, 2320 thereby minimizing the mutual inductance. The reduced mutual inductance results in a reduction or elimination of the previously described voltage waveform distortion. As such the coil 2300 does not require the additional inductors when present in the described current-drive differential rectifier. The coil 2300 may be better suited to space-constrained applications.

An experimental setup of the previously-described coil 300, and the coil 2300 was tested to illustrate this reduction.

Table 1 below contains exemplary values of the components of the coils 300, 2300 of the experimental setup:

TABLE 1

| Values | | |
|---|---|---|
| Value | Coil 300 | Coil 2300 |
| First sub-coil inductance | 328 nH | 367 nH |
| Second sub-coil inductance | 327 nH | 367 nH |
| Entire coil inductance | 1092 nH | 1073 nH |
| Mutual inductance M | −219 nH | −170 nH |
| Coupling factor k | 0.667 | 0.462 |

As intended, the coil 2300 has a significantly lower mutual inductance and coupling factor than the coil 300.

The experimental setup of the coils 300, 2300 was built and tested when aligned with a transmit coil. For testing, the transmit coil was tuned resonant and disconnected from the double impedance transformer. A load impedance of 12Ω was used to determine X21. The results of the testing are listed in Table 2 below:

TABLE 2

| VNA Measurements | | |
|---|---|---|
| Value | Coil 300 | Coil 2300 |
| Resonant Capacitance (per side) | 1010 pF | 1026 pF |
| Receive impedance ($Z_{RX}$) | 0.80 + j0.05 | 0.66 + j0.22 |
| Transmit impedance ($Z_{TX}$) | 1.30 + j0.25 | 1.42 + j0.27 |
| Input resistance ($R_{in}$) | 13.70 Ω | 13.15 Ω |
| X21 | 12.598 | 12.186 |
| S12 | 0.918 | 0.920 |
| Efficiency | 84.3% | 84.6% |

The values were determined using a vector network analyser (VNA). Note the values stated in Table 2 include the losses from connectors on both transmitter and receiver. Also note that the X21 is lower for the coil 2300, but the power transfer efficiency is approximately the same.

Further testing of the coil 2300 showed stable operation with no load and a rectifier voltage of 10 V, and reduced voltage distortion with similar resonance and zero voltage switching (ZVS) capacitances at a full load and rectifier voltage up to 21 V with ZVS.

FIGS. 20 to 23 are various views of an experimental receiver 2700 as described herein used for testing purposes. The receiver 2700 comprises the same elements as previously-described receiver 700 with like features having reference numerals incremented by 2000. The components of the rectifier 2702, i.e., inductors, capacitors and diodes, are mounted on a PCB 2701. The PCB 2701 is made from aluminium. The PCB 2701 acts as a shield as described with reference to the shield 250 or 250' depicted in FIGS. 3 and 6*c*, respectively.

The described receiver extracts power via inductive coupling from a transmitter. The transmitter and receiver thereby form a wireless power transfer system. The wireless power transfer system comprises a transmitter and any of the receivers. The wireless power system operates by transferring power from the transmitter that is non-resonant or not self-resonant to the receiver resonating at the operating frequency of the transmitter.

The transmitter is configured to transmit power wirelessly via magnetic inductive coupling. While an electric field may also be generated, little, if any, power is transferred via electric field coupling. The transmitter may transmit power wirelessly via magnetic inductive coupling as described in Applicant's own U.S. Patent Application Publication No 2021/0083634, the relevant portions of which are incorporated herein by reference.

As described the non-planar coil 300 of the described receivers supplies a constant AC current. As such the corresponding coil and inverter of the transmitter also supply a constant output voltage (constant amplitude and phase) independent of load.

Generally, the transmitter comprises a power source, a transmitter DC/DC converter, a DC/AC inverter, and a transmitter coil. The power source is electrically connected to the transmitter DC/DC converter. The power source is configured to generate a DC power signal. The power source is configured to output the DC power signal to the transmitter DC/DC converter. In this embodiment, the DC power signal is between 24 and 48 V. The transmitter DC/DC converter is electrically connected to the power source. The transmitter DC/DC converter is electrically connected to the DC/AC inverter. The transmitter DC/DC converter interfaces the power source to the DC/AC inverter. The transmitter DC/DC converter is configured to convert the DC power signal from the power source to a voltage level for transmission to the DC/AC inverter.

The DC/AC inverter is electrically connected to the transmitter DC/DC converter. The DC/AC inverter is electrically connected to the transmitter coil. The DC/AC inverter is configured to convert the DC power signal from the transmitter DC/DC converter into a sinusoidal radio frequency (RF) power signal. The sinusoidal RF power signal is output from the DC/AC converter to the transmitter coil.

The transmitter operates at a given frequency. In this embodiment, the operating frequency of the transmitter is 13.56 MHz. Furthermore, in this embodiment, the transmitter coil is identical to the described coil of the receiver, e.g., coil 300 or coil 300'.

While the transmitter has been described as comprising the transmitter DC/DC converter, one of skill in the art will appreciate that other configurations are possible. In another embodiment, the transmitter does not comprise the transmitter DC/DC converter. In this embodiment, the power source is electrically connected to the DC/AC inverter. The power source is configured to generate a DC power signal that is acceptable to the DC/AC inverter.

The receiver is configured to extract power from the transmitter via magnetic inductive coupling. While an electric field may also be generated, little, if any, power is extracted via electric field coupling.

Figure 24:
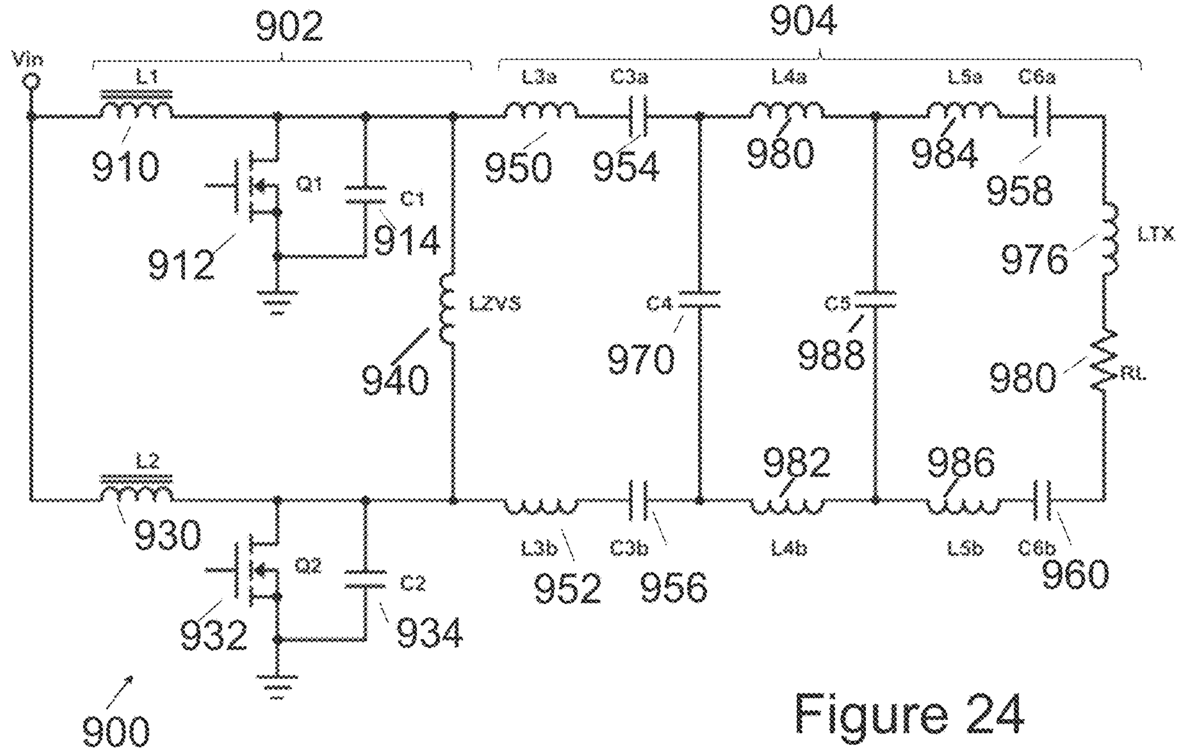
FIG. 24 is a schematic diagram of a portion of a transmitter comprising a current supplying inverter.

Turning now to FIG. 24 a schematic diagram of the DC/AC inverter 900 of a wireless power transfer system is shown. The DC/AC inverter 900 forms a portion of a transmitter of the system for use with the receivers as described. The DC/AC inverter 900 is load independent. The DC/AC inverter 900 has a voltage-mode output. Voltage-mode output indicates that the DC/AC inverter 900 has a constant voltage output. Thus, the DC/AC inverter 900 and its impedance transformation network supply a constant output voltage (constant amplitude and phase) regardless of load.

In the illustrated arrangement, the DC/AC inverter 900 comprises a load independent circuit 902 and an impedance inverter circuit 904. The DC/AC inverter 900 is current-mode output (constant output current).

The load independent circuit 902 is configured to convert an input DC signal into an output AC signal. The load independent circuit 902 is voltage-mode output (constant output voltage). The load independent circuit 902 comprises inductors 910, 930 having inductances $L_1$ and $L_2$ that receive an input voltage having a voltage $V_{in}$. Each inductor 910, 930 is connected in series to a combination of a transistor 912, 932, respectively, ($Q_1$ and $Q_2$) and a capacitor 914, 934, respectively. The capacitors 914, 934 have capacitances $C_1$ and $C_2$, respectively. Specifically, transistor 912 and capacitor 914 are arranged in parallel, and are connected to inductor 910. Transistor 932 and capacitor 934 are arranged in parallel and are connected to inductor 930. Both transistor 912, 932 and capacitor 914, 934 pairs are grounded. Inductor 940 having an inductance $L_{ZVS}$ is connected in parallel between the inductors 910, 912.

The impedance inverter circuit 904 is configured to convert the load independent circuit 902 from voltage-mode output (constant output voltage) to current-mode output (constant output current) and then back to from voltage-mode (constant output voltage). That is to say, the impedance inverter circuit 904 is a double-impedance network.

The impedance inverter circuit 904 has a T-network circuit configuration. The impedance inverter circuit 904 comprises inductors 950, 952, 980, 982, 984, 986, 976 having inductances $L_{3a}$, $L_{3b}$, $L_{4a}$, $L_{4b}$, $L_{5a}$, $L_{5b}$ and $L_{Tx}$, respectively; capacitors 954, 956, 958, 960 having capacitances $C_{3a}$, $C_{3b}$, $C_{3a}$ and $C_{3b}$, respectively; capacitors 970, 988 having capacitances $C_4$ and $C_5$, respectively; and resistor 980 having resistance $R_L$.

To simplify the derivation of the equations and evaluation of component values, inductances $L_3$ and $L_4$ are introduced such that inductance $L_3$ is equal to the sum of inductance $L_{3a}$ and inductance $L_{3b}$ ($L_3=L_{3a}+L_{3b}$). Inductance $L_4$ is equal to the sum of inductance $L_{4a}$ and inductance $L_{4b}$ ($L_4=L_{4a}+L_{4b}$).

Capacitances $C_3$ and $C_6$ are also introduced such that capacitance $C_3$ is equal to half the sum of capacitance $C_{3a}$ and capacitance $C_{3b}$ ($C_3=(C_{3a}+C_{3b})/2$). Capacitance $C_6$ is equal to half the sum of capacitance $C_{6a}$ and capacitance $C_{6b}$ ($C_6=(C_{6a}+C_{6b})/2$).

Each inductor 950, 952 is connected in series to a capacitor 954, 956, respectively. The inductor/capacitor pairs 950, 954 and 952, 956 are connected to either end of inductor 940 of the load independent circuit 902. Capacitor 970 is connected in parallel with inductor 940. Inductors 980, 982 are connected to either end of capacitor 970. Capacitor 988 is connected in parallel with capacitor 970. Further, inductor 984, capacitor 958, inductor 976, resistor 980, capacitor 960 and inductor 986 are connected in series, and together they are connected in parallel to capacitor 988.

Values of the described components are determined by the following equations. The relationship between capacitance $C_1$, capacitance $C_2$ and inductance $L_{ZVS}$ is given by Equation 5 below:

$$\frac{1}{\omega\sqrt{L_{ZVS}C_1}} = \frac{1}{\omega\sqrt{L_{ZVS}C_2}} = 0.985 \quad \text{(Equation 5)}$$

Inductance $L_3$ is given by Equation 6 below:

$$L_3 = \frac{1}{\omega^2}\left(\frac{1}{C_3} + \frac{1}{C_4}\right) + 0.258 \times L_{ZVS} \quad \text{(Equation 6)}$$

Inductance $L_4$ is given by Equation 7 below:

$$L_4 = \frac{1}{\omega^2}\left(\frac{1}{C_4} + \frac{1}{C_5}\right) \quad \text{(Equation 7)}$$

Inductance $L_5$ is given by Equation 8 below:

$$L_5 = \frac{1}{\omega^2}\left(\frac{1}{C_5} + \frac{1}{C_6}\right) - L_{TX} \quad \text{(Equation 8)}$$

Additionally, the voltage gain of this DC/AC inverter 900 illustrated in FIG. 24 is defined as the ratio of the AC voltage across the resistor 980 to the input DC voltage. The voltage gain is given by Equation 9:

$$\frac{V_{RL}}{V_{IN}} = 3.132 \times \frac{C_4}{C_5} \quad \text{(Equation 9)}$$

Figure 25:
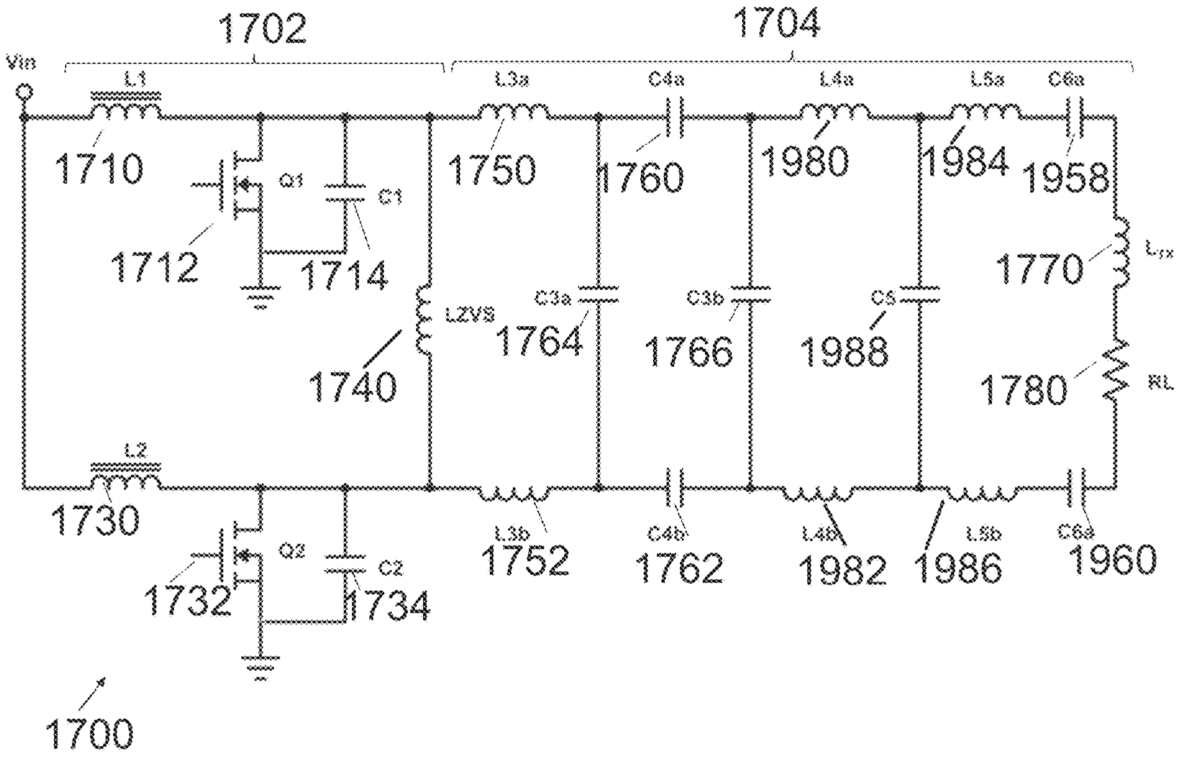
FIG. 25 is a schematic diagram of a portion of another embodiment of a transmitter comprising a current supplying inverter.

While a particular DC/AC inverter 900 has been described, one of skill in the art will appreciate that other configurations are possible. Turning now to FIG. 25, a schematic layout of another embodiment of the DC/AC inverter generally identified by reference numeral 1700 is shown. In this embodiment, the DC/AC inverter 1700 comprises a load independent circuit 1702 and an impedance inverter circuit 1704. The DC/AC inverter 1700 is voltage-mode output (constant output voltage).

The load independent circuit 1702 is configured to convert an input DC signal into an output AC signal. The load independent circuit 1702 is voltage-mode output (constant output voltage).

The load independent circuit 1702 comprises inductors 1710, 1730 having inductances $L_1$ and $L_2$ that receive an input voltage having a voltage $V_{in}$. Each inductor 7110, 1730 is connected in series to a combination of a transistor 1712,1 732, respectively, ($Q_1$ and $Q_2$) and a capacitor 1714, 1734, respectively. The capacitors 1714, 1734 have capacitances $C_1$ and $C_2$, respectively. Specifically, transistor 1712 and capacitor 1714 are arranged in parallel, and are connected to inductor 1710. Transistor 1732 and capacitor 1734 are arranged in parallel and are connected to inductor 1730. Both transistor 1712, 1732 and capacitor 1714, 1734 pairs are grounded. Inductor 1740 having an inductance $L_{ZVS}$ is connected in parallel between the inductors 1710, 1712.

The impedance inverter circuit 704 is configured to convert the load independent circuit 702 from voltage-mode output (constant output voltage) to current-mode output (constant output current) and back to voltage-mode (constant output voltage). In contrast with the impedance inverter circuit 1904, the impedance inverter circuit 1704 has a pi-network circuit configuration. The impedance inverter circuit 1704 comprises inductors 1750, 1752, 1980, 1982, 1984, 1986, 1770 having inductances $L_{3a}$, $L_{3b}$, $L_{4a}$, $L_{4b}$, $L_{5a}$, $L_{5b}$ and $L_{TX}$, respectively; capacitors 1760, 1762, 1764, 1766, 1958, 1960, 1988 having capacitances $C_{4a}$, $C_{4b}$, $C_{3a}$, $C_{3b}$, $C_{6a}$, $C_{6a}$, and $C_5$, respectively; and resistor 1780 having resistance $R_L$.

Capacitor 1764 having a capacitance $C_{3a}$ is connected in parallel to inductors 1750, 1752. Capacitors 1764 is also connected in parallel to capacitors 1760 and 1762. Capacitor 1766 having a capacitance $C_{3b}$ is connected in parallel to capacitors 1760, 1762. Capacitor 1766 is also connected in parallel to inductors 1980 and 1982. Capacitor 1988 having capacitance $C_5$ is connected in parallel to inductors 1980 and 1982. Capacitor 1988 is also connected in parallel to inductors 1984 and 1986. Inductor 1984, capacitors 1958, inductor 1770, resistor 1780, capacitor 1960 and inductors 1986 are connected in series, and these together are connected in parallel to capacitor 1988.

To simplify the derivation of the equations and evaluation of component values, inductances $L_3$ and $L_4$ are introduced such inductance $L_3$ is equal to the sum of inductance $L_{3a}$ and inductance $L_{3b}$ ($L_3=L_{3a}+L_{3b}$). Inductance $L_4$ is equal to the sum of inductance $L_{4a}$ and inductance $L_{4b}$ ($L_4=L_{4a}+L_{4b}$). Inductance $L_5$ is equal to the sum of inductance $L_{5a}$ and inductance $L_{5b}$ ($L_5=L_{5a}+L_{5b}$).

Capacitances $C_3$ and $C_6$ are also introduced such that capacitance $C_3$ is equal to half the sum of capacitance $C_{3a}$ and capacitance $C_{3b}$ ($C_3=(C_{3a}+C_{3b})/2$). $C_4$ is equal to half the sum of capacitance $C_{4a}$ and capacitance $C_{4b}$ ($C_4=(C_{4a}+C_{4b})/2$). $C_6$ is equal to half the sum of capacitance $C_{6a}$ and capacitance $C_{6b}$ ($C_6=(C_{6a}+C_{6b})/2$).

Values of the described components are determined by the following equations. The relationship between capacitance $C_1$, capacitance $C_2$ and inductance $L_{ZVS}$ is given by Equation 10 below:

$$\frac{1}{\omega\sqrt{L_{ZVS}C_1}} = \frac{1}{\omega\sqrt{L_{ZVS}C_2}} = 0.985 \quad \text{(Equation 10)}$$

Inductance $L_4$ is given by Equation 11 below:

$$L_4 = L_3 + \frac{1}{\omega^2 C_5} - 0.258 \times L_{ZVS} \quad \text{(Equation 11)}$$

Inductance $L_5$ is given by Equation 12 below:

$$L_5 = \frac{1}{\omega^2}\left(\frac{1}{C_5} + \frac{1}{C_6}\right) - L_{TX} \quad \text{(Equation 12)}$$

The voltage gain of the inverter 1700 is defined as the ratio of the AC voltage across the resistor 1780 to the input DC voltage. The voltage gain is given by Equation 13 below:

$$\frac{V_{RL}}{V_{IN}} = 3.132 \times \left(\frac{2C_3}{C_5} + \frac{C_3^2}{C_4C_5}\right) \quad \text{(Equation 13)}$$

The DC/AC inverter 1700 allows the voltage in the transmitter coil to be set independently of the input DC voltage and the inductance of the transmitter coil.

Although particular arrangements have been described with reference to particular figures, those of skill in the art will appreciate that arrangements may be combined. For example, the arrangement illustrated with additional third and fourth inductors 550, 552 in FIG. 12 may be combined with the synchronous rectifier arrangement illustrated in FIG. 15. Other similar combinations of the arrangements are included in the scope of the subject disclosure.

Although embodiments have been described above with reference to the figures, those of skill in the art will appreciate that variations and modifications may be made without departing from the scope thereof as defined by the appended claims.

What is claimed is:

1. A differential current-driven rectifier for use in a receiver for receiving wireless power via inductive coupling, the differential current-driven rectifier comprising:

a first capacitor and a second capacitor;

a first switching element and a second switching element;

a first inductor and a second inductor; and a third capacitor for dampening or reducing voltage ringing at the differential current-driven rectifier, the first capacitor and the first inductor electrically connected directly to a first node, and the second capacitor and the second inductor electrically connected directly to a second node;

the first switching element electrically connected to the first node between the first capacitor and the first inductor, and the second switching element electrically connected to the second node between the second capacitor and the second inductor;

the first capacitor electrically connected between a terminal of a coil for receiving power wirelessly via inductive coupling and the first node, and the second capacitor electrically connected between another terminal of the coil for receiving power wirelessly via inductive coupling and the second node;

the first switching element and the second switching element electrically connected to a tap of the coil for receiving power wirelessly via inductive coupling;

the third capacitor electrically connected to one of the first switching element and the second switching element via a third node, and electrically connected directly to one of the first node and the second node, wherein the third capacitor has a capacitance equal to $$C = \frac{0.175}{wR_{Load}},$$

where C is the capacitance of the third capacitor, where w is a frequency of operation of the differential current-driven rectifier, and where $R_{Load}$ is a resistance of an output load connected to the differential current-driven rectifier; and the first inductor and the second inductor electrically connected to a fourth node at which a constant DC current is provided.

2. The differential current-driven rectifier of claim 1, wherein the third capacitor is electrically connected to the first switching element via the third node and directly to the first node.

3. The differential current-driven rectifier of claim 2, further comprising a fourth capacitor electrically connected to the second switching element via the third node and directly to the second node, wherein the fourth capacitor has a capacitance equal to $$C = \frac{0.175}{wR_{Load}},$$

where C is the capacitance of the fourth capacitor, where w is the frequency of operation of the differential current-driven rectifier, and where $R_{Load}$ is the resistance of the output load connected to the differential current-driven rectifier.

4. A receiver for use in a wireless power transfer system, the receiver for receiving power via inductive coupling, the receiver comprising:

the differential current-driven rectifier of claim 1; and a coil for extracting power from a generated field via inductive coupling.

5. The receiver of claim 4, wherein the first capacitor and the first inductor are electrically connected directly to the first node with the first switching element electrically connected to the first node between the first capacitor and the first inductor, and/or the second capacitor and the second inductor are electrically connected directly to the second node with the second switching element electrically connected to the second node between the second capacitor and the second inductor.

6. The receiver of claim 4, further comprising at least one additional inductor electrically connected to the one of the terminals or the tap of the coil.

7. The receiver of claim 4, further comprising a fourth capacitor electrically connected to the fourth node between the first inductor and load electrically connected to the differential current-driven rectifier, the fourth capacitor for filtering a power signal output by the differential current-driven rectifier.

8. The receiver of claim 4, wherein the coil comprises at least two windings, an outer turn of a first winding and an inner turn of a second winding forming a first sub-coil of the coil, and an inner turn of the first winding and an outer turn of the second winding forming a second sub-coil of the coil.

9. The receiver of claim 8, wherein a first terminal is formed at a termination of the outer turn of the first winding or the inner turn of the first winding, and a second terminal is formed at a termination of the outer turn of the second winding or the inner turn of the second winding, and wherein the tap is formed between the first terminal and the second terminal to split the coil into the first sub-coil and the second sub-coil.

10. The receiver of claim 9, wherein the differential current-driven rectifier is a synchronous rectifier, the first switching element is a first transistor, and the second switching element is a second transistor, and the differential current-driven rectifier further comprising:

the first transistor electrically connected to the tap of the coil and the first terminal of the coil; and the second transistor electrically connected to the tap of the coil and the second terminal of the coil.

11. The receiver of claim 10, further comprising:

a first signal generator electrically connected to the first transistor for generating a pulse signal to drive the first transistor;

a second signal generator electrically connected to the second transistor for generating a pulse signal to drive the second transistor;

a first delay line electrically connected to the first terminal of the coil, the first delay line for synchronizing operation of the first transistor; and a second delay line electrically connected to the second terminal of the coil, the second delay line for synchronizing operation of the second transistor.

12. A method of rectifying a power signal received at a receiver of a wireless power transfer system, the method comprising:

extracting power from a generated field via inductive coupling at a coil to generate an AC power signal; and rectifying, with a differential current-driven rectifier, the AC power signal, the differential current-driven rectifier comprising a first capacitor and a second capacitor; a first switching element and a second switching element; a first inductor and a second inductor; and a third capacitor for dampening or reducing voltage ringing at the differential current-driven rectifier, the first capacitor and the first inductor electrically connected directly to a first node, and the second capacitor and the second inductor electrically connected directly to a second node;

the first switching element electrically connected to the first node between the first capacitor and the first inductor, and the second switching element electrically connected to the second node between the second capacitor and the second inductor;

the first capacitor electrically connected between a terminal of the coil for receiving power wirelessly via inductive coupling and the first node, and the second capacitor electrically connected between another terminal of the coil for receiving power wirelessly via inductive coupling and the second node;

the first switching element and the second switching element electrically connected to a tap of the coil for receiving power wirelessly via inductive coupling;

the third capacitor electrically connected to one of the first switching element and the second switching element via a third node, and electrically connected directly to one of the first node and the second node, wherein the third capacitor has a capacitance equal to $$C = \frac{0.175}{wR_{Load}},$$

where C is the capacitance of the third capacitor, where w is a frequency of operation of the differential current-driven rectifier, and where $R_{Load}$ is a resistance of an output load connected to the differential current-driven rectifier; and the first inductor and the second inductor electrically connected to a fourth node at which a constant DC current is provided.

* * * * *